(12) United States Patent
Urakami

(10) Patent No.: US 7,868,942 B2
(45) Date of Patent: Jan. 11, 2011

(54) DRIVING DEVICE FOR REMOVING FOREIGN SUBSTANCE SUCH AS DUST AND IMAGE PICKUP APPARATUS

(75) Inventor: Toshifumi Urakami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 312 days.

(21) Appl. No.: 12/146,250

(22) Filed: Jun. 25, 2008

(65) Prior Publication Data

US 2009/0015705 A1 Jan. 15, 2009

(30) Foreign Application Priority Data

Jul. 9, 2007 (JP) ............................. 2007-179740

(51) Int. Cl.
*H04N 5/225* (2006.01)
(52) U.S. Cl. ....................... 348/340; 348/335; 348/373; 348/374; 348/375; 348/351
(58) Field of Classification Search ................. 348/335, 348/340, 351, 208.11, 205, 373–376; 396/529, 396/533, 439; 359/507, 508
See application file for complete search history.

(56) References Cited

U.S. PATENT DOCUMENTS

| 7,006,138 | B2 | 2/2006 | Kawai |
| 7,215,372 | B2 | 5/2007 | Ito |
| 2004/0047625 | A1 | 3/2004 | Ito et al. |
| 2008/0297641 | A1* | 12/2008 | Urakami ..................... 348/335 |
| 2008/0297646 | A1* | 12/2008 | Urakami et al. ............. 348/340 |

FOREIGN PATENT DOCUMENTS

| CN | 1462145 A | 12/2003 |
| JP | 2000-166265 A | 6/2000 |

* cited by examiner

*Primary Examiner*—Yogesh K Aggarwal
(74) *Attorney, Agent, or Firm*—Canon U.S.A., Inc. I.P. Division

(57) ABSTRACT

A driving device and an image pickup apparatus including the driving device capable of reliably detecting a vibration state of a vibrated member even when a piezoelectric element including as a control circuit an H-bridge circuit which contributes miniaturization of the circuit is employed are provided. In this driving device, a single piezoelectric member including a first driving electrode and a vibration detection electrode on a first side and a second driving electrode and a ground electrode on a second side is attached to an optical low-pass filter serving as the vibrated member so as to vibrate the optical low-pass filter. Furthermore, the vibration detection electrode is used to detect the vibration status of the optical low-pass filter.

6 Claims, 16 Drawing Sheets

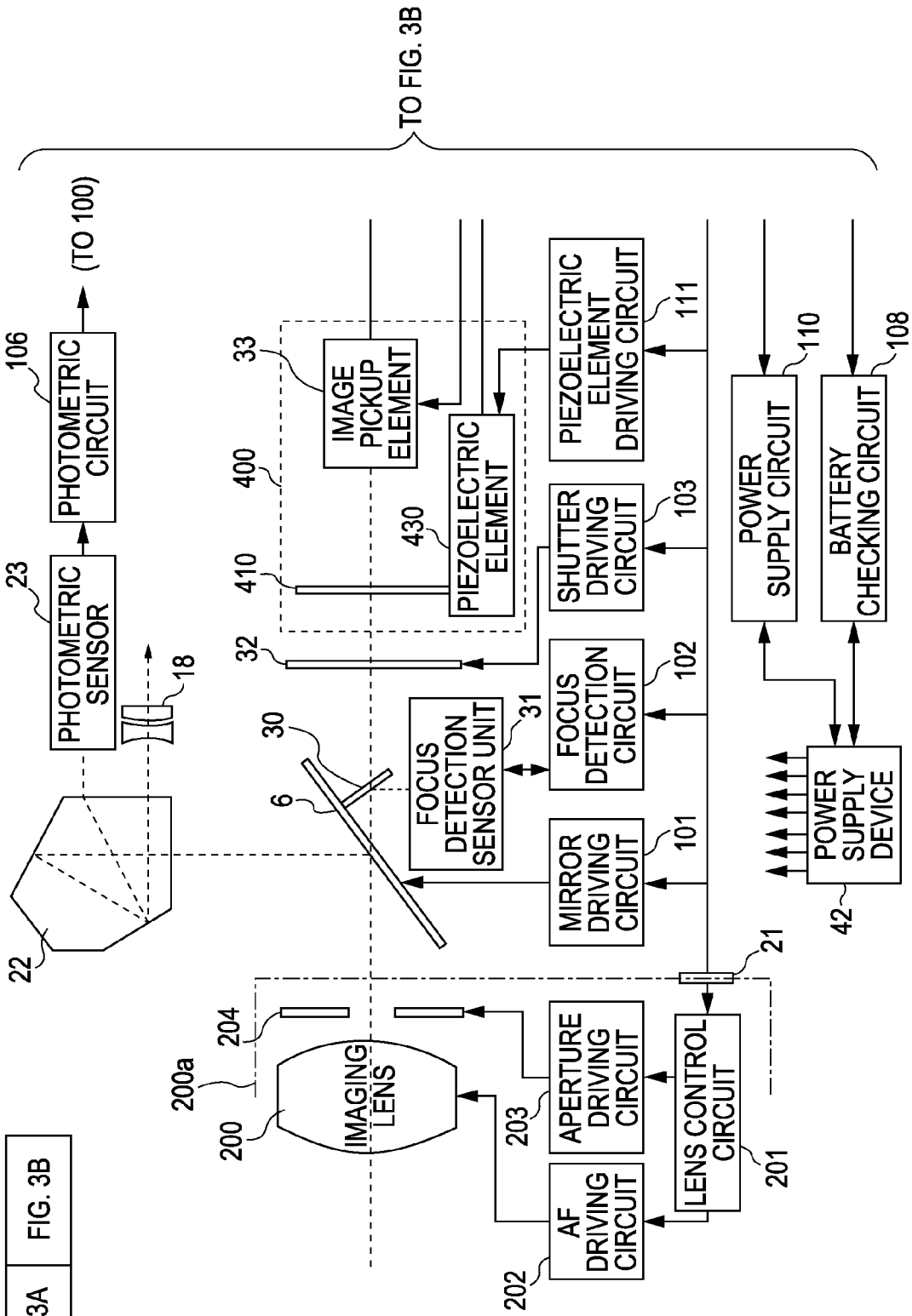

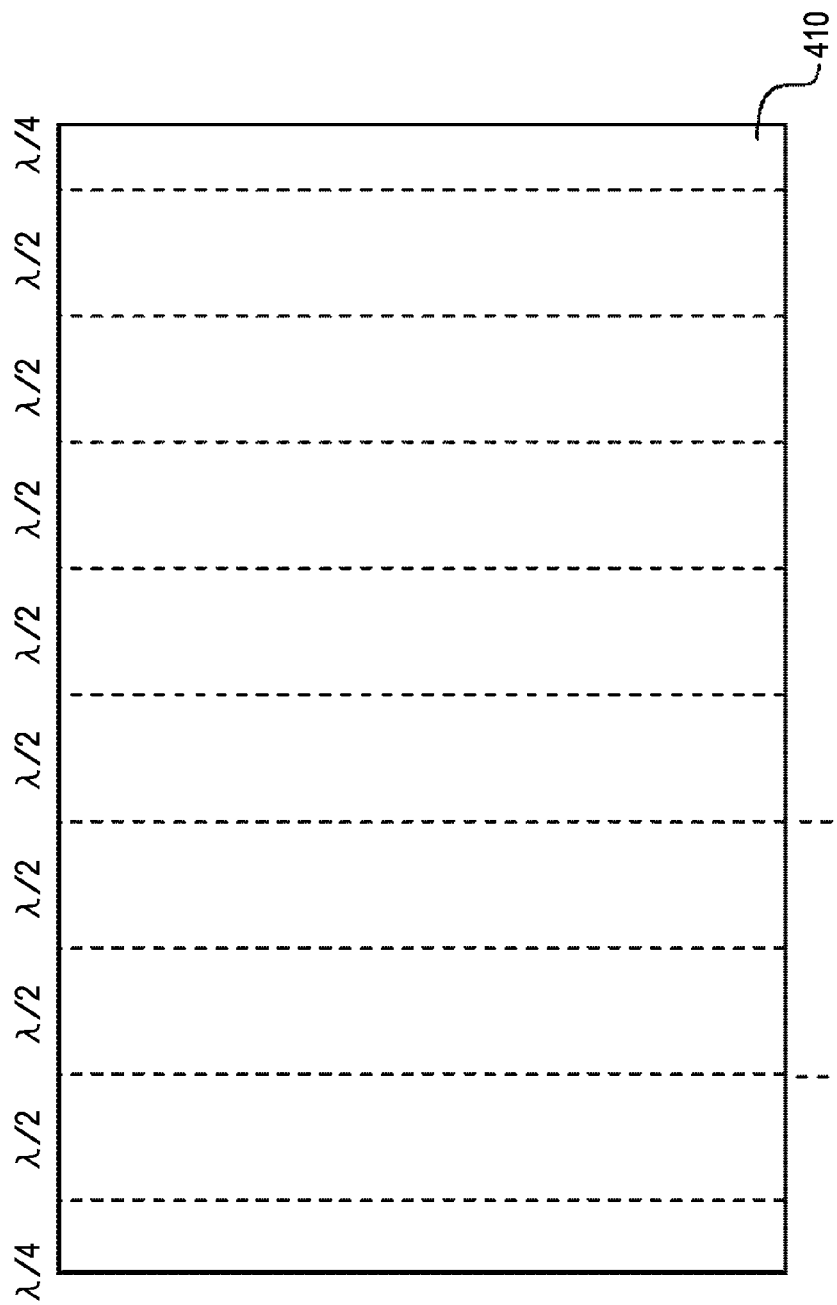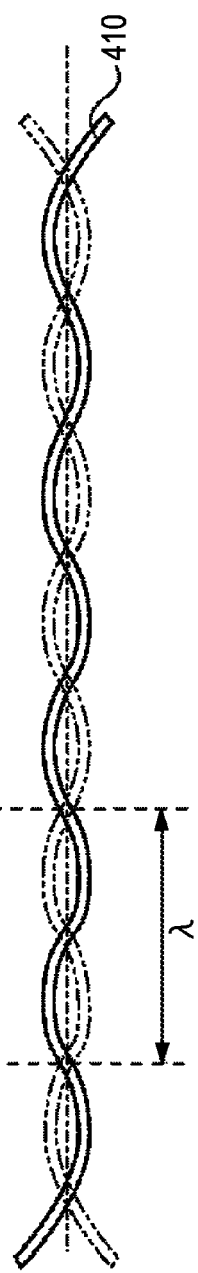
FIG. 14A
FIG. 14B

DRIVING DEVICE FOR REMOVING FOREIGN SUBSTANCE SUCH AS DUST AND IMAGE PICKUP APPARATUS

CROSS-REFERENCE TO RELATED APPLICATIONS

The present application is related to U.S. patent application Ser. No. 12/126,718, entitled "Optical Apparatus Having Device For Removing Foreign Substance", filed on May 23, 2008. The present application is also related to U.S. patent application Ser. No. 12/129,260, entitled "Optical Apparatus having Device For Removing Foreign Substance", filed on May 29, 2008. Furthermore, the present application is also related to U.S. patent application Ser. No. 12/129,268, entitled "Optical Apparatus having Device For Removing Foreign Substance", filed on May 29, 2008.

Moreover, this application claims the benefit of Japanese Application No. 2007-179740 filed Jul. 9, 2007, which is hereby incorporated by reference herein in its entirety.

BACKGROUND OF THE INVENTION

1. Field of the Invention

The present invention relates to techniques of removing foreign substances such as dust, and particularly relates to a technique of removing foreign substances such as dust which adhere to a surface of an optical member arranged in front of an image pickup element in an image pickup apparatus such as a digital still camera.

2. Description of the Related Art

In general, image pickup apparatuses such as digital still cameras capture objects and convert images of the objects into electric signals. In such an image pickup apparatus, an imaging light beam is received using an image pickup element, a photoelectric conversion signal output from the image pickup element is converted into image data, and the image data is stored in a recording medium such as a memory card. Examples of the image pickup element include a CCD (charge coupled device) sensor and a CMOS (complementary metal oxide semiconductor) sensor.

In such an image pickup apparatus, an optical low-pass filter or an infrared absorption filter is arranged on an object side of the image pickup element. If foreign substances such as dust adhere to surfaces of the filters, portions to which the foreign substances adhere are shown as dark spots in a captured image, and accordingly, appearance of the image is deteriorated.

In particular, in a digital single-lens reflex camera having a replaceable lens, since mechanical operation portions such as a shutter and a quick-return mirror are arranged in the vicinity of an image pickup element, foreign substances such as dust generated due to operations of the operation portions may adhere to a surface of an image pickup element and a surfaces of a filter. In addition, when the lens is replaced by another lens, foreign substances such as dust may enter from an opening of a lens mount into a camera body and may adhere to the inside of the camera body.

To avoid this problem, U.S. Pat. Nos. 7,006,138 and 7,215,372 disclose techniques of removing foreign substances such as dust adhering to surfaces of anti-dust filters which allow imaging light beams to be transmitted to object sides of image pickup elements by vibrating the filters using piezoelectric elements.

In such a technique, preferably, a wide vibration width is obtained by vibrating an anti-dust filter in a resonant frequency using the piezoelectric element so that the foreign substances such as dust are effectively removed. However, since the resonant frequency is determined in accordance with an external form, a thickness, and a property value of the anti-dust filter, for example, different anti-dust filters have different resonant frequencies due to variation-generating factors such as a processing accuracy and a manufacturing process.

Here, a camera disclosed in U.S. Pat. No. 7,006,138 has a piezoelectric element which applies vibration to a peripheral portion of a circular anti-dust filter (anti-dust optical member), and has an electrode which is used to detect a vibration state of the optical member and which is provided on the piezoelectric element separately from an electrode used for a driving operation. Then, a voltage of the electrode is monitored so that a resonant frequency is detected, and the optical member is vibrated using the resonant frequency so that the foreign substances such as dust adhering to a surface of the optical member are removed.

Furthermore, as with the case of U.S. Pat. No. 7,006,138, a camera disclosed in U.S. Pat. No. 7,215,372 has a piezoelectric element which applies vibration to a peripheral portion of a circular anti-dust filter (anti-dust optical member). Furthermore, the camera includes an electrode which is used to detect a vibration state of the optical member and which is provided on the piezoelectric element separately from an electrode used for a driving operation, and a voltage of the electrode is monitored. Then, the voltage of the electrode is compared with a normal voltage stored in advance. As a result of the comparison, when it is determined that the vibration state is abnormal, an operation of removing dust is not performed.

As a circuit used to drive a piezoelectric element, a half-bridge circuit is generally used. The half-bridge circuit has a simple circuit configuration in which an input voltage (power supply voltage or booster voltage) is directly used to drive the piezoelectric element. Alternatively, an H-bridge (full bridge) circuit may be employed. Although a configuration of the H-bridge circuit is more complicated than that of the half-bridge circuit, a driving voltage twice an input voltage can be applied to the piezoelectric element. Therefore, when identical driving voltages are applied to respective piezoelectric elements using the H-bridge circuit and the half-bridge circuit, the H-bridge circuit only requires the input voltage half of the input voltage of the half-bridge circuit. Accordingly, withstand pressure standards of circuit elements may be reduced and miniaturization of the circuit is attained.

However, although the configuration of the vibration detection described above is appropriately employed in the half-bridge circuit serving as the driving circuit for the piezoelectric element, when the configuration is employed in the H-bridge circuit, the vibration of the optical member is not properly detected.

SUMMARY OF THE INVENTION

Accordingly, the present invention provides a driving device capable of reliably detecting a vibration state of a vibrated member even when an H-bridge circuit which contributes miniaturization of the circuit is employed as a control circuit of a piezoelectric element, and an image pickup apparatus including the driving device.

According to an embodiment of the present invention, there is provided a driving device including a vibrated member, a single piezoelectric member which vibrates the vibrated member, a first driving electrode formed on a first surface of the piezoelectric member, a second driving electrode which is formed on a second surface of the piezoelectric member facing the first surface of the piezoelectric member and which faces the first driving electrode, a vibration detection electrode formed on the first surface of the piezoelectric member separately from the first driving electrode, a ground electrode formed on the second surface of the piezoelectric member separately from the second driving electrode so as to face the vibration detection electrode, a control circuit configured to be connected to the first and second driving electrodes, configured to cause the second driving electrode to be connected to a ground when a voltage is applied to the first driving electrode, and configured to cause the first driving electrode to be connected to the ground when a voltage is applied to the second driving electrode, and a resonant frequency detection unit configured to be connected to the vibration detection electrode and configured to detect resonant frequencies of the vibrated member.

According to another embodiment of the present invention, there is provided an image pickup apparatus including the driving device. The vibrated member corresponds to an optical element arranged in front of an image pickup element which performs photoelectric conversion on an object image. The piezoelectric member is bonded to the optical element in a position outside a portion on which an effective light beam of the object image is incident.

Further features and aspects of the present invention will become apparent from the following description of exemplary embodiments with reference to the attached drawings.

BRIEF DESCRIPTION OF THE DRAWINGS

FIGS. 3A and 3B are block diagrams illustrating an example electric configuration of the digital single-lens reflex camera according to the exemplary embodiment of the present invention.

FIGS. 14A and 14B are diagrams illustrating a vibration waveform of the optical low-pass filter solely operated.

DESCRIPTION OF THE EMBODIMENTS

Exemplary Configuration of Camera

Figure 1:
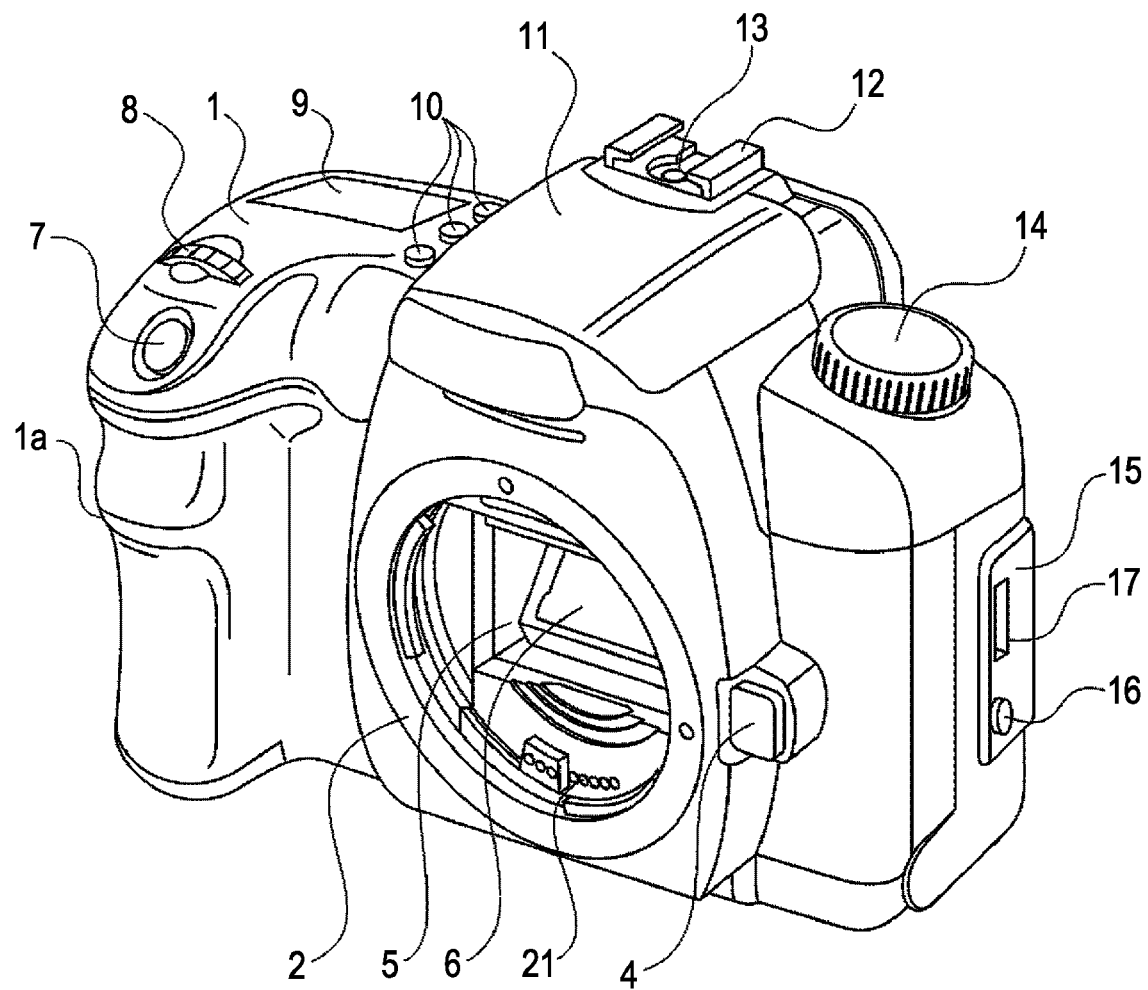
FIG. 1 is a front perspective view illustrating an example digital single-lens reflex camera according to an exemplary embodiment of the present invention.
Figure 2:
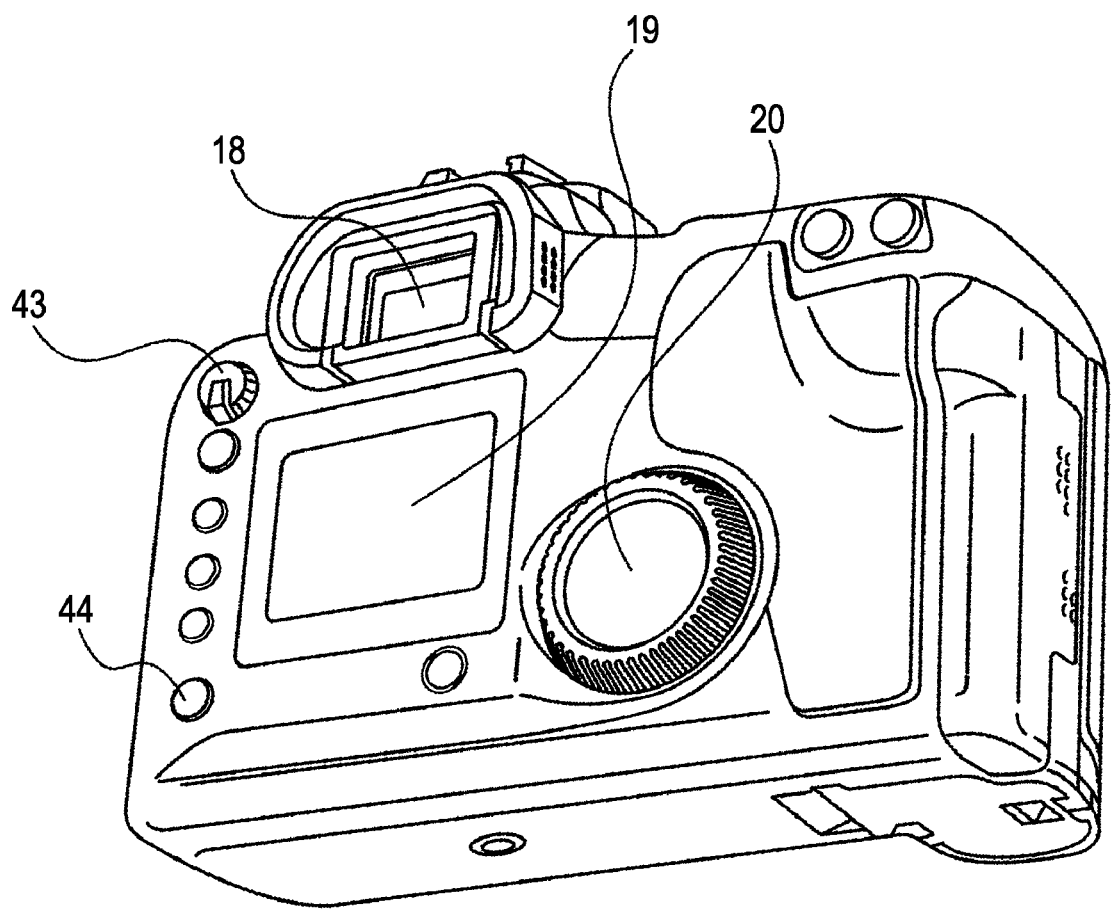
FIG. 2 is a rear perspective view illustrating the digital single-lens reflex camera according to the exemplary embodiment of the present invention.

An example digital single-lens reflex camera according to an exemplary embodiment of the present invention will be described with reference to FIGS. 1, 2, 3A and 3B. FIGS. 1 and 2 are external views illustrating the digital single-lens reflex camera according to the exemplary embodiment. FIG. 1 is a front perspective view illustrating the camera viewed from an object side. In FIG. 1, an imaging lens unit of the camera is detached. FIG. 2 is a rear perspective view illustrating the camera viewed from a user side.

As shown in FIG. 1, a camera body 1 includes a grip portion 1a which projects to the object side so that a user can tightly grip the camera at a time of photographing.

The camera body 1 further includes a mount portion 2 to which the imaging lens unit (not shown in FIGS. 1 and 2) is detachably fixed. The camera body 1 further includes a mount contact 21 which is used to transmit control signals, status signals, and data signals, for example, between the camera body 1 and the imaging lens unit and which is used to supply electric power to the imaging lens unit. The mount contact 21 may be capable of performing optical communication and audio communication, for example, in addition to an electric communication. A lens lock cancel button 4 to be pressed when the imaging lens unit is detached is disposed beside the mount portion 2.

The camera body 1 further includes a mirror box 5 on which an imaging light beam passed through the imaging lens is incident, and the mirror box 5 includes a main mirror (quick return mirror) 6. The main mirror 6 has two states, that is, a state in which the main mirror 6 is held with an angle of 45° relative to an image pickup optical axis so that the imaging light beam is introduced toward a penta-Dach mirror 22 (refer to FIG. 3A) and a state in which the main mirror 6 is held in a retracted position so as not to receive the imaging light beam so that the imaging light beam is introduced toward an image pickup element 33 (refer to FIG. 3A).

A release button 7 serving as an activation switch for a photographing operation, a main operation dial 8 used to set a shutter speed and a value of lens aperture in accordance with a mode of the photographing operation, and an upper-surface operation mode setting button 10 for setting a mode of an imaging system are arranged on an upper surface of the camera and in the vicinity of the grip portion 1a. A number of results of operations of these operation members are displayed in an LCD display panel 9. A first stroke of the release button 7 causes a switch SW1 (corresponding to a reference numeral 7a of FIG. 3B) to be turned on, and a second stroke of the release button 7 causes a switch SW2 (corresponding to a reference numeral 7b of FIG. 3B) to be turned on. The upper-surface operation mode setting button 10 is used to determine whether a continuous photographing operation is performed or a one-frame photographing operation is performed when the release button 7 is pressed once and also used to set a self-photographing mode. States of these settings are displayed in the LCD display panel 9.

The camera body 1 further includes near the center of the upper surface thereof an electronic flash unit 11 which pops up from the camera body 1, grooves 12 to which an electronic flash is attached, and a flash contact 13. In addition, a photographing mode setting dial 14 is arranged on an upper right portion of the camera. An openable external terminal cover 15 is arranged on a surface of the camera which is opposite to the grip portion 1a. Furthermore, a video signal output jack 16 and a USB output connector 17 are accommodated in the external terminal cover 15.

Referring to FIG. 2, a finder eyepiece window 18 is arranged on an upper portion of the rear surface of the camera. Furthermore, a color liquid crystal monitor 19 capable of displaying images is arranged near the center of the rear surface of the camera.

A sub operation dial 20 is arranged beside the color liquid crystal monitor 19. The sub operation dial 20 assists a function of the main operation dial 8. For example, in an AE (auto exposure) mode of the camera, the sub operation dial 20 is used to set an amount of exposure correction in accordance with an appropriate exposure value calculated using an auto exposure device. In a manual mode in which a desired shutter speed and a desired lens aperture are set by a user, the shutter speed is set using the main operation dial 8 and the lens aperture is set using the sub operation dial 20. The sub operation dial 20 is also used to select one of images which were captured and which are displayed in the color liquid crystal monitor 19.

Furthermore, on the rear surface of the camera, a main switch 43 used to start or stop an operation of the camera and a cleaning instruction operation member 44 used to enter a cleaning mode are arranged. The cleaning instruction operation member 44, which will be described in detail hereinafter, is used to instruct an operation of removing foreign substances such as dust adhering to a surface of an optical low-pass filter 410. Note that the cleaning mode may be arbitrarily entered in response to an instruction issued using the cleaning instruction operation member 44, and may be automatically entered when the main switch 43 is turned on and/or when the main switch 43 is turned off.

Figure 3B:
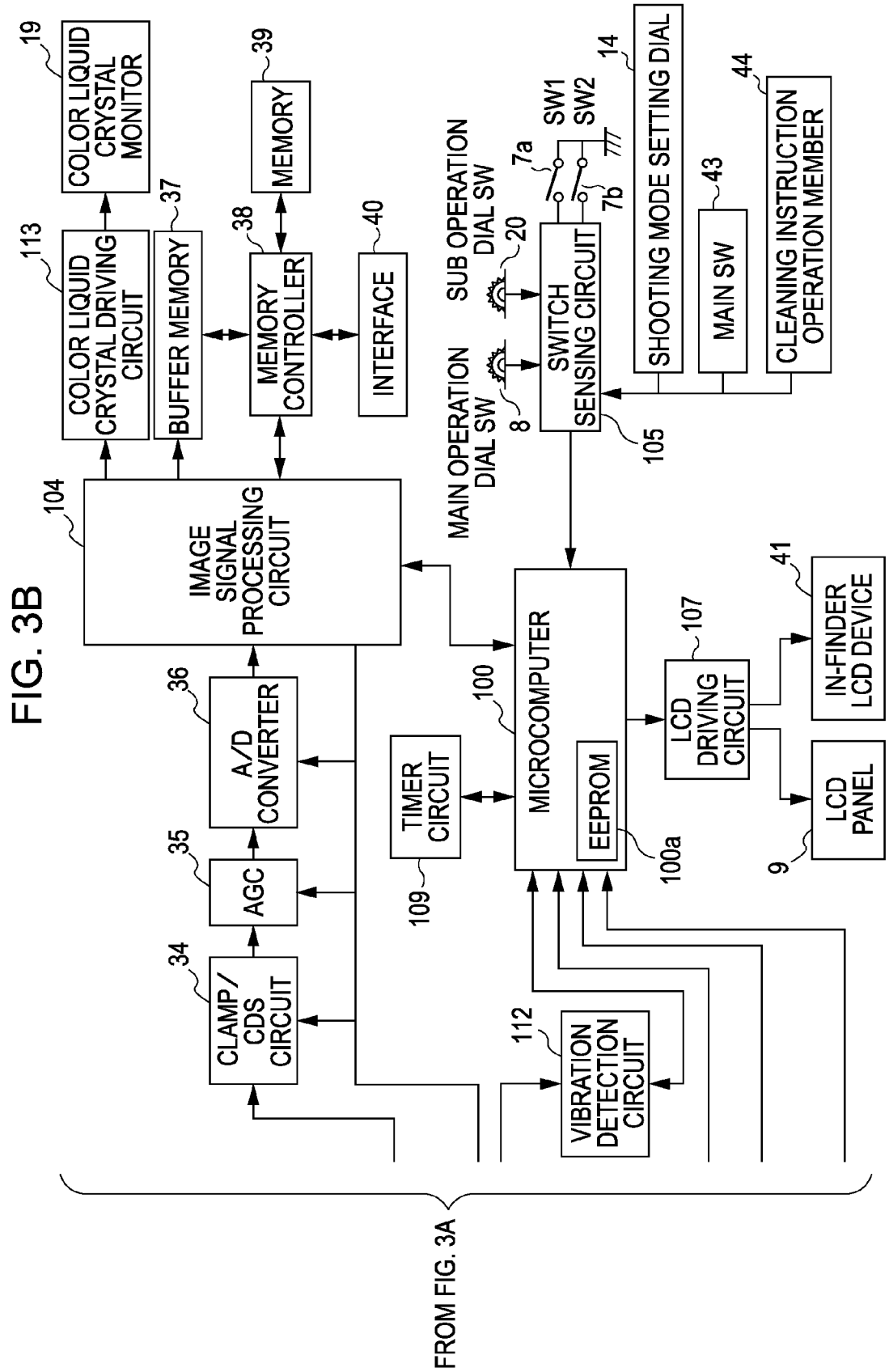

FIGS. 3A and 3B are block diagrams illustrating a primary electric configuration of the digital single-lens reflex camera according to this exemplary embodiment. Note that components in FIGS. 3A and 3B corresponding to those shown in FIGS. 1 and 2 are denoted by reference numerals the same as those shown in FIGS. 1 and 2. A central processing unit 100 including a microcomputer (hereinafter referred to as an "MPU") incorporated in the camera body 1 controls an entire operation of the camera, that is, performs various processes on various components and instructs various components to perform various processes. An EEPROM 100a incorporated in the MPU 100 stores therein timer information of a timer circuit 109 and a variety of information.

The MPU 100 is connected to a mirror driving circuit 101, a focus detection circuit 102, a shutter driving circuit 103, an image signal processing circuit 104, a switch sensing circuit 105, and a photometric circuit 106. Furthermore, the MPU 100 is connected to an LCD driving circuit 107, a battery checking circuit 108, the timer circuit 109, a power supply circuit 110, a piezoelectric element driving circuit 111, and a vibration detection circuit 112. The MPU 100 controls these circuits.

The MPU 100 communicates with a lens control circuit 201 included in an imaging lens unit 200a through the mount contact 21. The mount contact 21 has a function of transmitting a signal to the MPU 100 when the imaging lens unit 200a is connected to the mount contact 21. In this way, the lens control circuit 201 communicates with the MPU 100 and drives an imaging lens 200 and an aperture 204 included in the imaging lens unit 200a using an AF driving circuit 202 and an aperture driving circuit 203, respectively. Note that although the single imaging lens 200 is shown in FIG. 3A for simplicity, the imaging lens 200 is constituted by a plurality of lenses for practical use.

The AF driving circuit 202 is constituted by a stepping motor, for example, and shifts a position of a focus lens included in the imaging lens 200 under the control of the lens control circuit 201 so that the imaging light beam is focused onto the image pickup element 33. The aperture driving circuit 203 is constituted by an autoiris, for example, and change the aperture 204 under the control of the lens control circuit 201 so as to obtain an optical aperture value.

The main mirror 6 is maintained in an angle of 45° relative to the image pickup optical axis shown in FIG. 3A, guides the imaging light beam passing through the imaging lens 200 to the a penta-Dach mirror 22, and allows part of the imaging light beam to be transmitted so as to guide the part of the imaging light beam to a sub-mirror 30. The sub-mirror 30 guides the part of imaging light beam transmitted through the main mirror 6 to a focus detection sensor unit 31.

The mirror driving circuit 101 is constituted by a DC motor and a gear train, for example, and moves the main mirror 6 to a position in which the main mirror 6 enables an object image to be observed using a finder or a position retracted from the imaging light beam. When the main mirror 6 is driven, the sub-mirror 30 is simultaneously moved in a position in which the sub-mirror 30 guides the imaging light beam to the focus detection sensor unit 31 or a position retracted from the imaging light beam.

The focus detection sensor unit 31 is constituted by, for example, a line sensor including a field lens, a reflection mirror, a secondary image forming lens, an aperture, and a plurality of CCD sensors arranged in the vicinity of an image plane (not shown), and performs a focus detection operation employing a phase difference method. The focus detection sensor unit 31 supplies a signal to the focus detection circuit 102 where the signal is converted into an object image signal. The focus detection circuit 102 supplies the object image signal to the MPU 100. The MPU 100 performs focus detection calculation employing the phase difference method in accordance with the object image signal. Then, the MPU 100 obtains an amount of defocus and a defocus direction, and drives and the focus lens included in the imaging lens 200 through the lens control circuit 201 and the AF driving circuit 202 so that the focus lens moves to a focus position.

The penta-Dach mirror 22 reflects the imaging light beam reflected by the main mirror 6 so as to convert the imaging light beam into an erect image. A user can observe the object image using the finder eyepiece window 18 through a finder optical system. The penta-Dach mirror 22 also guides part of the imaging light beam to a photometric sensor 23. The photometric circuit 106 receives signals output from the photometric sensor 23 and converts the signals into luminance signals for areas on an observed plane. The photometric circuit 106 supplies the luminance signals to the MPU 100. The MPU 100 calculates an exposure value in accordance with the luminance signals.

A shutter unit (focal-plane shutter) 32 has a shutter first curtain and a shutter second curtain. When the user observes an object image through a finder, the shutter first curtain is located in a light-shielding position and the shutter second curtain is located in an exposure position. When a photographing operation is performed, the shutter first curtain moves from the light-shielding position to the exposure position, which is referred to as an exposure movement operation, so as to allow light emitted from the object to be transmitted. Then, an image pickup operation is performed using the image pickup element 33. After a lapse of a desired shutter time, the shutter second curtain moves from the exposure position to the light-shielding position, which is referred to as a light-shielding movement operation, and then the photographing operation is terminated. The focal-plane shutter 32 is controlled using the shutter driving circuit 103 under the control of the MPU 100.

An image pickup unit 400 includes the optical low-pass filter 410, a piezoelectric element 430 including a piezoelectric member and a plurality of electrodes, and the image pickup element 33, which are integrated with other components, which will be described hereinafter, as a unit. The image pickup element 33 performs photoelectric conversion on the object image, and a CMOS sensor is employed as the image pickup element 33 in this exemplary embodiment. However, any of various image pickup elements such as a CCD sensor may be employed as the image pickup element 33. The optical low-pass filter 410 arranged in front of the image pickup element 33 is constituted by a single birefringent plate made of quartz and has a rectangular shape.

A clamp/CDS (correlation double sampling) circuit 34 performs primary analog processing before A/D conversion is performed, and is capable of changing a clamp level. An AGC (auto gain control device) 35 performs primary analog processing before the A/C conversion is performed, and is capable of changing an AGC basic level. An A/D converter 36 converts an analog signal output from the image pickup element 33 into a digital signal.

The image signal processing circuit 104 performs entire image processing using hardware on digital image data. The image processing includes gamma/knee processing, filter processing, and processing of synthesizing information to be displayed in a monitor. The image signal processing circuit 104 supplies the image data through a color liquid crystal driving circuit 113 to the color liquid crystal monitor 19 so that an image corresponding to the image data is displayed.

Furthermore, the image signal processing circuit 104 controls a buffer memory 37 through a memory controller 38 to store the image data therein in accordance with an instruction issued from the MPU 100. Moreover, the image signal processing circuit 104 performs image data compression processing on images such as JPEG images. When image pickup operations are continuously performed or a continuous photographing operation is performed, for example, pieces of image data are first stored in the buffer memory 37, and the pieces of image data which have not yet been processed are successively read using the memory controller 38. By this, the image signal processing circuit 104 performs image processing and compression processing on image data irrespective of input speed of the image data supplied from the A/D converter 36.

The memory controller 38 has a function of controlling a memory 39 to store image data supplied from an external interface 40 and outputting the image data stored in the memory 39 through the external interface 40. Note that the external interface 40 corresponds to the video signal output jack 16 and the USB output connector 17 in FIG. 1. As the memory 39, a flash memory detachable from the camera body 1, for example, is employed.

The switch sensing circuit 105 transmits an input signal to the MPU 100 in accordance with an operation state of each of the switches SW1 and SW2. The first stroke (half press) of the release button 7 causes the switch SW1 (7a) to be turned on. The second stroke (full press) of the release button 7 causes the switch SW2 (7b) to be turned on. When the switch SW1 (7a) is turned on, an instruction of start of photographing preparation is supplied to the MPU 100. When the switch SW2 (7b) is turned on, an instruction of start of a photographing operation is supplied to the MPU 100. The switch sensing circuit 105 is further connected to the main operation dial 8, the sub operation dial 20, the photographing mode setting dial 14, the main switch 43, and the cleaning instruction operation member 44.

The LCD driving circuit 107 drives the LCD display panel 9 and an in-finder LCD device 41 under the control of the MPU 100.

The battery checking circuit 108 checks a battery in response to an instruction issued from the MPU 100 and transmits a result of the checking to the MPU 100. A power supply device 42 supplies electric power to the components included in the camera.

The timer circuit 109 detects a date and time and measures a time period from when the main switch 43 is turned off to when the main switch 43 is next turned on, and transmits results of the measurement to the MPU 100 in response to an instruction issued from the MPU 100.

Exemplary Structure for Removing Foreign Substance

Figure 4:
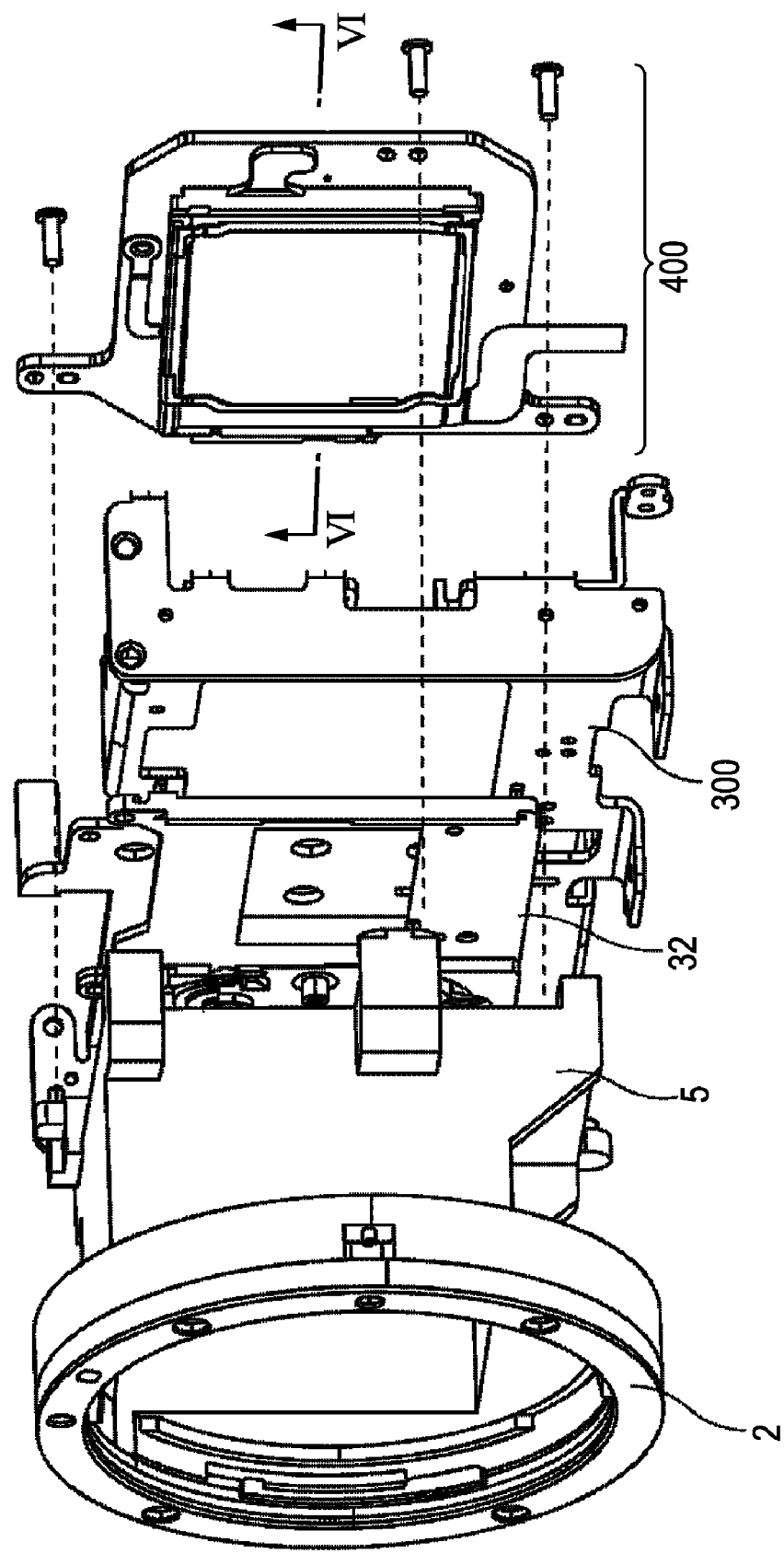
FIG. 4 is an exploded perspective view schematically illustrating an example supporting configuration of an image pickup unit inside the camera.
Figure 5:
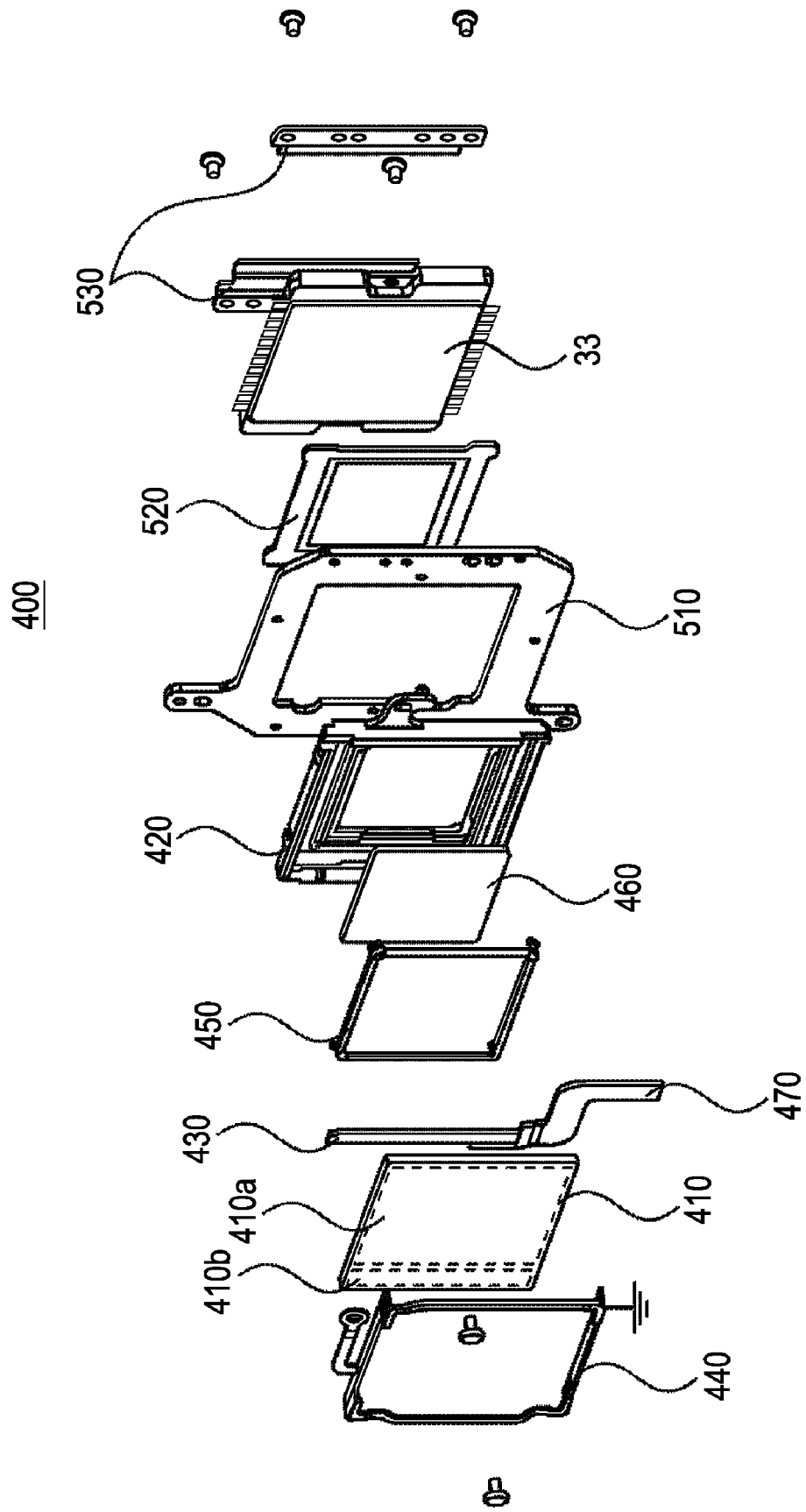
FIG. 5 is an exploded perspective view illustrating an example configuration of the image pickup unit.
Figure 6:
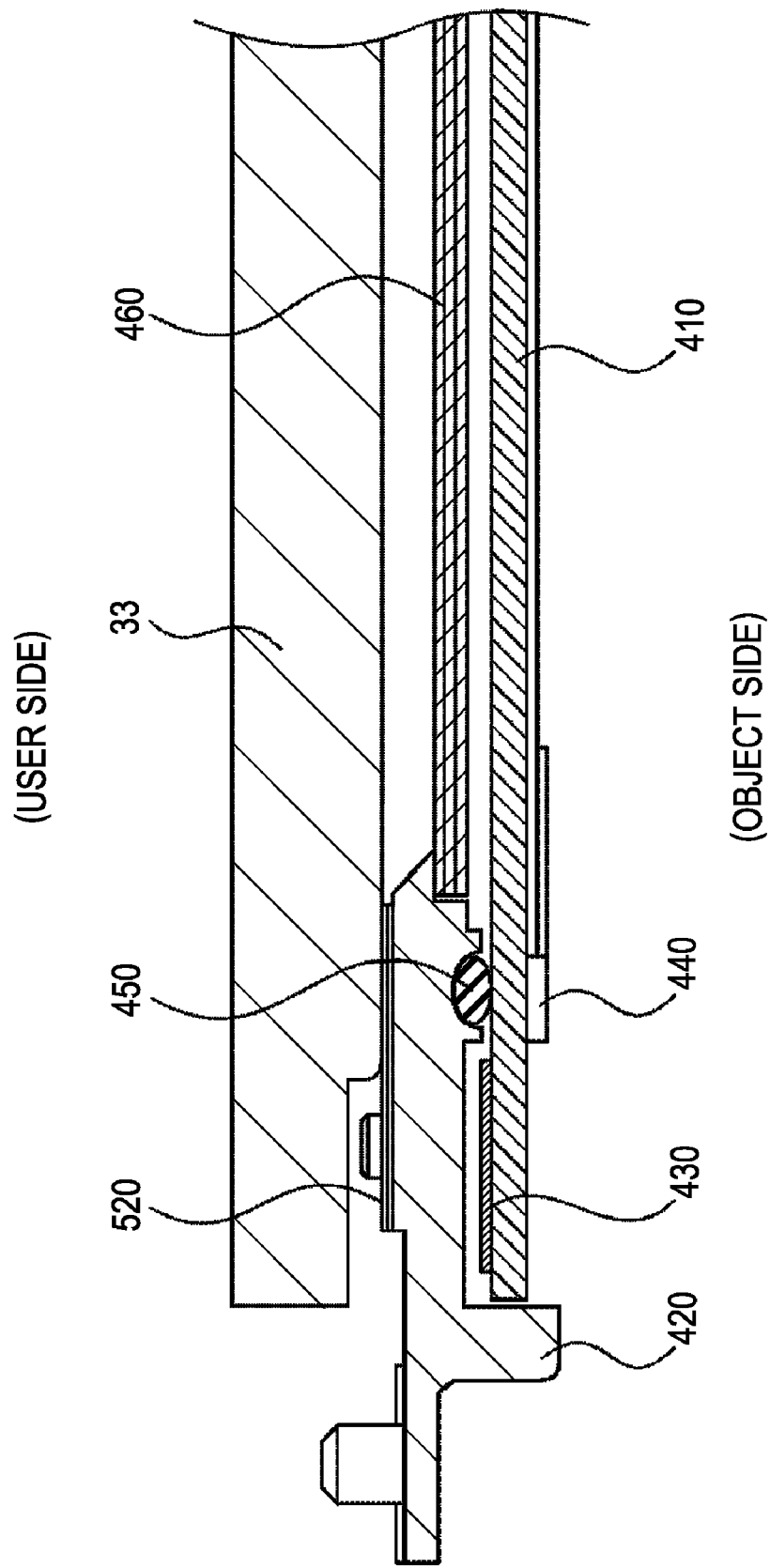
FIG. 6 is a sectional view taken along a line VI-VI of FIG. 4.

Referring to FIGS. 4 to 6, an example structure for removing foreign substances by vibrating the optical low-pass filter 410 according to this exemplary embodiment will be described. FIG. 4 is an exploded perspective view schematically illustrating a supporting configuration of the image pickup unit 400 inside the camera. FIG. 5 is an exploded perspective view illustrating a configuration of the image pickup unit 400.

As shown in FIG. 4, the mirror box 5 and the shutter unit 32 are disposed on the object side of a body chassis 300 which is a skeleton of the camera body in this order when viewed from the object side. The image pickup unit 400 is disposed on the user side of the body chassis 300. The image pickup unit 400 is fixed so that an image pickup surface of the image pickup element 33 is arranged so as to be parallel to an attachment surface of the mount portion 2 which serves as a reference of attachment of the imaging lens unit with a predetermined interval.

As shown in FIG. 5, the optical low-pass filter 410 is formed of a single birefringent plate made of quartz and has a rectangular shape. The optical low-pass filter 410 is a vibrated member according to the exemplary embodiment of the present invention, and corresponds to an optical element arranged in front of the image pickup element 33. The optical low-pass filter 410 has a peripheral portion 410b on one side of an image pickup effective region 410a, and the piezoelectric element 430 is disposed on the peripheral portion 410b. The optical low-pass filter 410 is asymmetrical in a direction orthogonal to the center of the image pickup optical axis (a left and right direction of the camera). Since the image pickup effective region 410a and the peripheral portion 410b are arranged so as not to overlap with each other, the piezoelectric element 430 is prevented from disturbing an effective light beam of the object image.

Furthermore, conduction coating which gives a conduction property and optical coating such as antireflection coating are applied to a surface of the optical low-pass filter 410.

The piezoelectric element 430 is constituted by a piezoelectric member and a plurality of electrode integrally arranged on the piezoelectric member, and has a strip shape. The piezoelectric element 430 is bonded to the peripheral portion 410b of the optical low-pass filter 410 so that long sides of the piezoelectric element 430 are parallel to short sides of the optical low-pass filter 410. That is, the piezoelectric element 430 is bonded to the optical low-pass filter 410 in the vicinity of one of four sides of the optical low-pass filter 410 and in parallel to the one side. The optical low-pass filter 410 is vibrated so that a plurality of nodes and a plurality of antinodes which are parallel to the one side are generated. An example of vibration will be described in detail hereinafter.

An optical low-pass filter holding member 420 formed of resin or metal holds the optical low-pass filter 410 and is fixed on an image pickup element holding member 510 using screws. A flexible printed substrate 470 used to apply voltage on the piezoelectric element 430 is connected to the electrodes arranged on the piezoelectric element 430.

An urging member 440 abuts on the optical low-pass filter 410 at four portions of the optical low-pass filter 410 which are located out of the image pickup effective region 410a so as to urge the optical low-pass filter 410 toward the image pickup element 33 (refer to FIGS. 12A, 12B, and 13), and is engaged with the optical low-pass filter holding member 420. The urging member 440 is grounded and the surface (to which the conduction coating and the optical coating are applied) of the optical low-pass filter 410 which abuts on the urging member 440 is also grounded. Therefore, adhesion of dust, for example, due to static electricity to the surface of the optical low-pass filter 410 is prevented.

An elastic member 450 is provided having a circular cross-section, and contacts the optical low-pass filter 410 and the optical low-pass filter holding member 420 so as to be sandwiched therebetween. An amount of force of the contact depends on an amount of urging force of the urging member 440 toward the image pickup element 33. Note that the elastic member 450 may be formed of rubber or high molecular weight polymer such as boron or plastic as long as an elastic body is obtained as the elastic member 450.

An optical member 460 includes a phase plate (depolarization plate), an infrared cut filter, and a birefringent plate having a refraction direction of 90° relative to the optical low-pass filter 410 which are laminated on one another, and is bonded and fixed on the optical low-pass filter holding member 420.

The image pickup element holding member 510 having a plate-like shape includes a rectangular opening portion. The image pickup element 33 is attached to the image pickup element holding member 510 so that the image pickup element 33 is exposed from the opening portion. The image pickup element holding member 510 has a peripheral portion thereof including three fixing portions used to fix the image pickup element holding member 510 to the mirror box 5 using screws.

A mask 520 is used to prevent unnecessary external light emitted from an outside of the optical path from being incident on the image pickup element 33. The mask 520 contacts the optical low-pass filter holding member 420 and the image pickup element 33 so as to be sandwiched therebetween.

An Urging member 530 for the image pickup element includes a pair of left and right plate springs. The urging member 530 is fixed to the image pickup element holding member 510 using screws and urges the image pickup element 33 onto the image pickup element holding member 510.

With this configuration, the optical low-pass filter 410 is sandwiched and supported between the urging member 440 and the elastic member 450 so as to be vibrated. Although detailed description will be made hereinafter, supported positions (supported portions) of the optical low-pass filter 410 are preferably located in the vicinity of the nodes of the vibration of the optical low-pass filter 410. Note that the nodes correspond to portions having vibration widths of substantially zero.

FIG. 6 is a sectional view taken along a line VI-VI of FIG. 4. Note that the image pickup element holding member 510 is omitted in FIG. 6. A first surface of the mask 520 on the user side abuts on the image pickup element 33, and a second surface of the mask 520 on the object side abuts on the optical low-pass filter holding member 420. Double-sided tapes are applied to the first surface and the second surface of the mask 520. The optical low-pass filter holding member 420 is firmly fixed to the image pickup element 33 with the double-sided tapes of the mask 520. The optical member 460 has a peripheral portion bonded to a predetermined holding portion of the optical low-pass filter holding member 420 so as to be held by the optical low-pass filter holding member 420. In this way, a space defined by the optical low-pass filter holding member 420, the image pickup element 33, the mask 520, and the optical member 460 is sealed so as to form a sealed space which does not allow foreign substances such as dust to enter.

A first surface of the elastic member 450 on the user side abuts on the optical low-pass filter holding member 420, and a second surface of the elastic member 450 on the object side abuts on the optical low-pass filter 410. Since the optical low-pass filter 410 is urged toward the image pickup element 33 due to elastic force of the urging member 440, the elastic member 450 is deformed and contacts the optical low-pass filter 410 and the optical low-pass filter holding member 420 without gaps. In this way, a space defined by the optical low-pass filter 410, the optical low-pass filter holding member 420, the elastic member 450, and the optical member 460 is sealed so as to form a sealed space which does not allow foreign substances such as dust to enter.

Example Arrangement of Electrodes of Piezoelectric Element

Figure 7A:
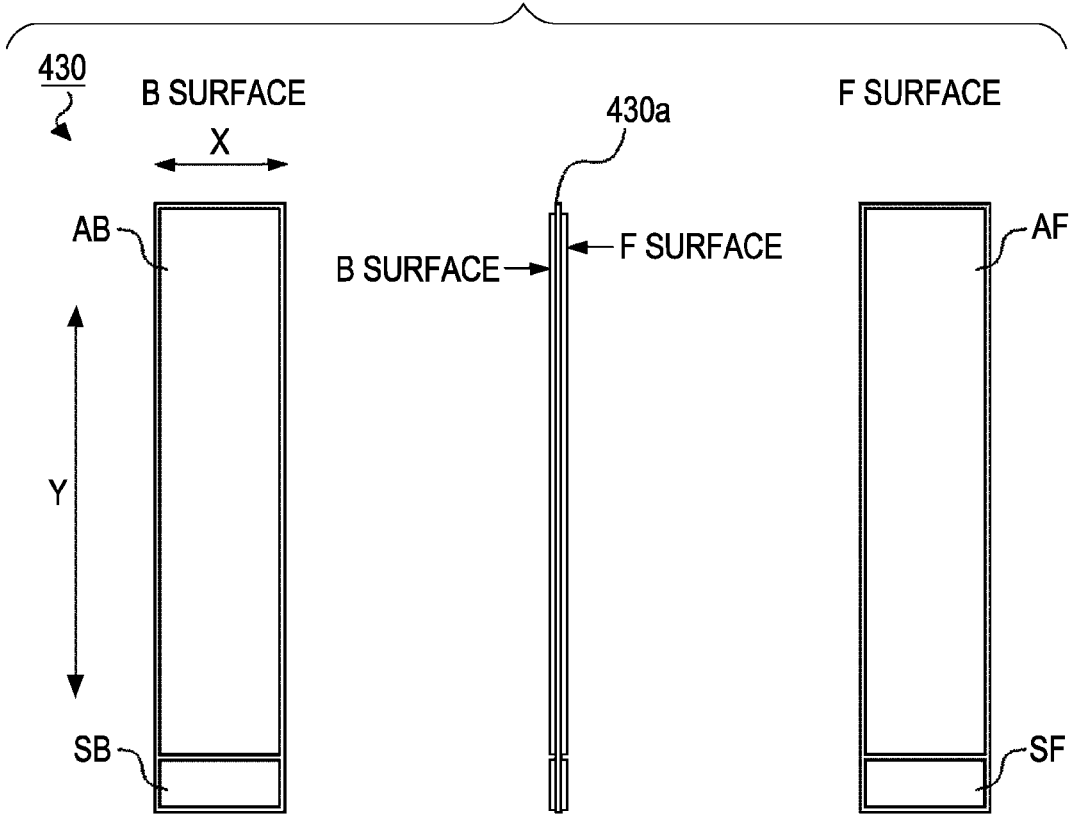
FIGS. 7A and 7B are diagrams illustrating an example arrangement of electrodes of a piezoelectric element configuration.
Figure 7B:
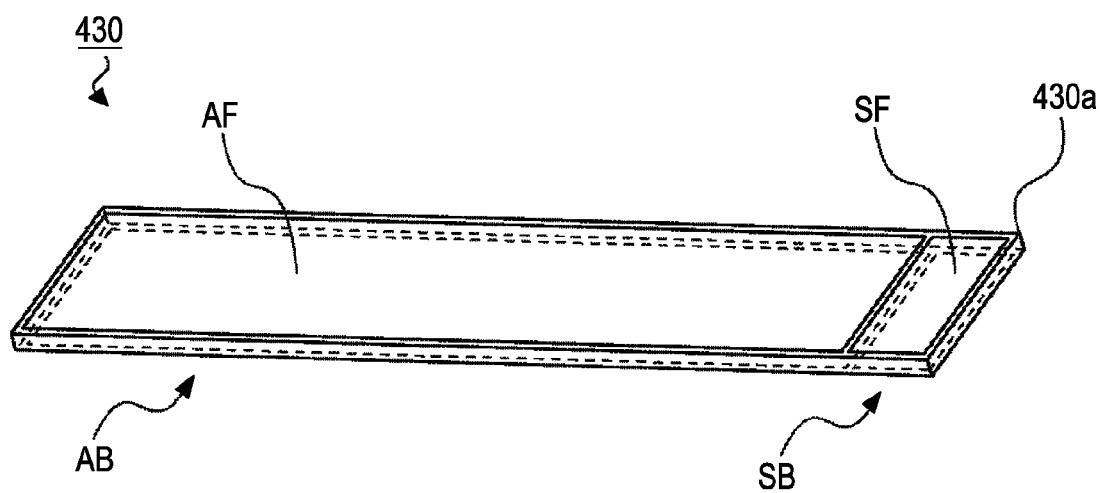
Figure 8A:
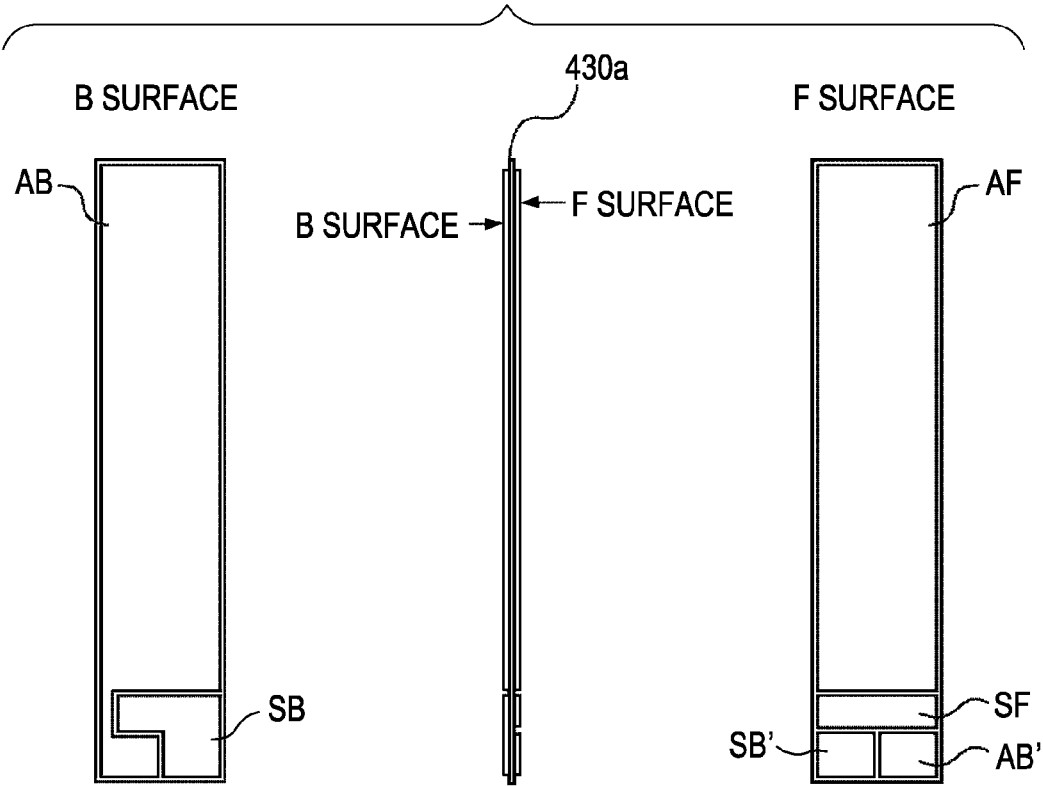
FIGS. 8A and 8B are diagrams illustrating another example arrangement of electrodes of the piezoelectric element.
Figure 8B:
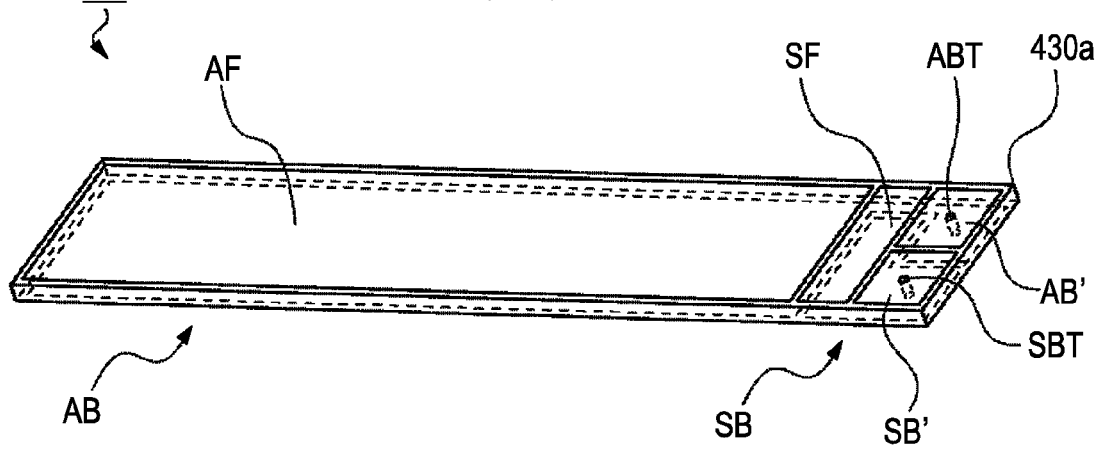

FIGS. 7A, 7B, 8A, and 8B are diagrams illustrating the piezoelectric element 430 in detail. FIGS. 7A and 7B show arrangement of the electrodes simply configured. FIGS. 8A and 8B show preferable arrangement of the electrodes according to this exemplary embodiment.

First, the simple arrangement of the electrodes will be described. FIG. 7A shows a first surface (F-surface) and a second surface (B-surface) of the piezoelectric element 430, and a side surface of the piezoelectric element 430. FIG. 7B is a perspective view illustrating the piezoelectric element 430 viewed from an F-surface side. As shown in FIGS. 7A and 7B, the piezoelectric element 430 includes a piezoelectric member 430a which is a single piezoelectric element and four electrodes, i.e., an electrode AF, an electrode AB, an electrode SF, and an electrode SB which are arranged on the piezoelectric member 430a.

The electrodes AF and AB are driving electrodes (a first driving electrode and a second driving electrode) which are arranged so as to be opposed to each other with the piezoelectric member 430a interposed therebetween and which excite a standing wave in the optical low-pass filter 410. When the piezoelectric element driving circuit 111 serving as a control circuit alternately applies voltage to the driving electrodes, a standing wave vibration having nodes and antinodes which are arranged in parallel to a direction indicated by an arrow Y is generated.

The electrode SF is a vibration detection electrode which detects vibration generated in the piezoelectric member 430a or the optical low-pass filter 410. Specifically, the electrode SF detects vibration by monitoring change of electric charge voltage generated in the electrode SF relative to the electrode SB which is a ground electrode normally grounded and which is arranged so as to be opposed to the electrode SF with the piezoelectric member 430a interposed therebetween.

Since the electrodes AF and AB serving as the driving electrodes are used to generate standing wave vibration in the optical low-pass filter 410, the electrodes AF and AB are preferably larger than the electrodes SF and SB and further as large as possible so as to obtain large driving force. Furthermore, the electrode SF serving as the vibration detection electrode preferably has a shape in which long sides thereof extend in a direction indicated by an arrow X which is orthogonal to a direction (a node direction or an antinode direction) indicated by an arrow Y which is a direction in which nodes and antinodes of the standing wave are generated so that the standing wave vibration generated by the driving electrodes is reliably detected.

Each of the electrodes AB, AF, SB, and SF are independently connected to the flexible printed substrate 470 for the piezoelectric element 430. The electrodes AF and AB serving as the driving electrodes are connected to the piezoelectric element driving circuit 111 through wiring of the flexible printed substrate 470, the electrode SF serving as the vibration detection electrode is connected to the vibration detection circuit 112 through the wiring of the flexible printed substrate 470, and the electrode SB is connected to the ground through the wiring of the flexible printed substrate 470.

The piezoelectric element 430 configured as described above is fixed to the peripheral portion 410b of the optical low-pass filter 410 by bonding the B-surface or the F-surface to the peripheral portion 410b.

The peripheral portion 410b of the optical low-pass filter 410 to which the piezoelectric element 430 is bonded is preferably not subjected to the conduction coating and the optical coating so that the driving force of the piezoelectric element 430 is not deteriorated, that is, the piezoelectric element 430 directly contacts the optical low-pass filter 410. However, a region which contacts the electrode SB serving as the ground electrode is preferably configured so as to be electrically connected to the electrode SB by extending conduction coating from the image pickup effective region 410a so that a stable grounded state of the image pickup effective region 410a is attained.

Next, preferable arrangement of the electrodes according to this exemplary embodiment will be described. FIG. 8A shows a first surface (F-surface as with FIG. 7) and a second surface (B-surface as with FIG. 7) of the piezoelectric element 430, and a side surface of the piezoelectric element 430. FIG. 8B is a perspective view illustrating the piezoelectric element 430 viewed from an F-surface side. As shown in FIGS. 8A and 8B, the piezoelectric element 430 includes a piezoelectric member 430a which is a single piezoelectric element and six electrodes, i.e., an electrode AF, an electrode AB, an electrode SF, and an electrode SB, an electrode AB', and an electrode SB' which are arranged on the piezoelectric member 430a.

As with the piezoelectric element 430 shown in FIGS. 7A and 7B, the electrodes AF and AB serve as driving electrodes, the electrode SF serves as a vibration detection electrode, and the electrode SB serves as a ground electrode normally grounded.

The arrangement of the electrodes shown in FIGS. 8A and 8B are different from that shown in FIGS. 7A and 7B in that the electrodes AB and SB arranged on the B-surface are electrically connected to the electrodes AB' and SB' arranged on the F-surface via through holes ABT and SBT.

With this configuration, the driving electrodes, the vibration detection electrode, and the ground electrode are led to the f-surface side so as to be connected to the flexible printed substrate 470 for the piezoelectric element 430. Accordingly, a workability of assembly of the unit is improved. In addition, when the B-surface is bonded to the peripheral portion 410b of the optical low-pass filter 410, since unevenness of a bonding surface is avoided. Specifically, since the flexible printed substrate 470 is not connected to the bonding surface, unevenness due to a thickness of the flexible printed substrate 470 is not generated. Accordingly, an adhesion property and vibration efficiency of the optical low-pass filter 410 are improved.

Description of Vibration

Figure 9:
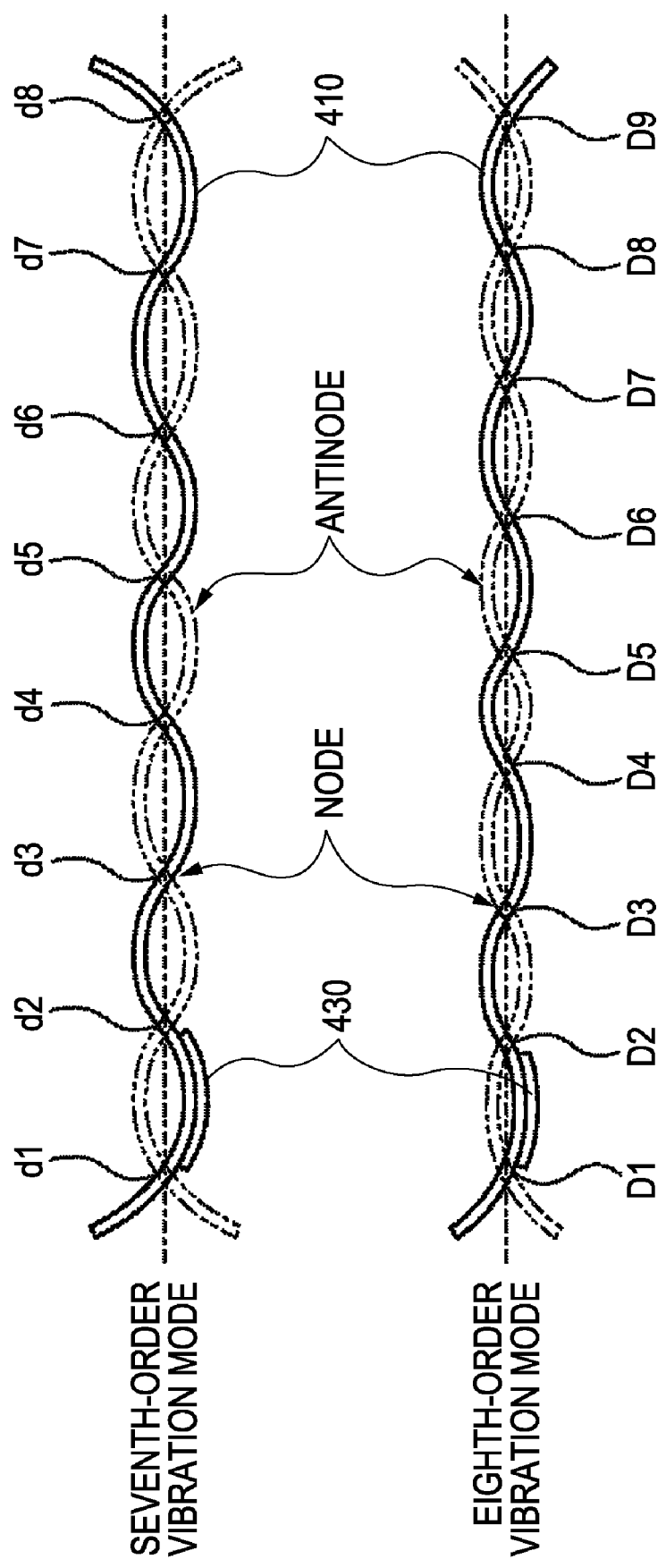
FIG. 9 is a side view of vibration forms of an optical low-pass filter and the piezoelectric element.

Referring now to FIG. 9, a vibration operation of removing foreign substances adhering to the optical low-pass filter 410 will be described. FIG. 9 is a side view of vibration forms of the optical low-pass filter 410 and the piezoelectric element 430 in the image pickup unit 400. The piezoelectric element 430 is integrally attached to the optical low-pass filter 410 on the B-surface thereof. Specifically, FIG. 9 shows state changes (vibration forms) of the optical low-pass filter 410 and the piezoelectric element 430 when a driving voltage is applied to the piezoelectric element 430.

It is assumed that a positive voltage is applied to the electrode AF of the piezoelectric element 430 through the flexible printed substrate 470 for the piezoelectric element 430, and the electrode AB is grounded (0V). In this case, the piezoelectric element 430 expands in a plane direction thereof and shrinks in a thickness direction thereof. The optical low-pass filter 410 attached to the piezoelectric element 430 receives force in a direction in which a bonding surface is enlarged. When the optical low-pass filter 410 receives the force, one surface of the optical low-pass filter 410 facing the piezoelectric element 430 deforms in a direction in which the optical low-pass filter 410 expands and the other surface of the optical low-pass filter 410 deforms in a direction in which the optical low-pass filter 410 shrinks in a sectional view. Therefore, the optical low-pass filter 410 has a deformed portion having a protrusion to which the piezoelectric element 430 attached. This deformed portion of the optical low-pass filter 410 is continuously formed so as to obtain a plurality of deformed portions. Therefore, in the sectional view of the optical low-pass filter 410, flexion deformity in which pairs of a recessed portion and a projection portion are continuously formed is generated. Specifically, when a positive voltage is applied to the electrode AF, the flexion deformity indicated by solid lines shown in FIG. 9 is generated in the optical low-pass filter 410.

Similarly, assuming that a positive voltage is applied to the electrode AB and the electrode AF is grounded (0V), the piezoelectric element 430 shrinks in the plane direction thereof and expands in the thickness direction thereof. The optical low-pass filter 410 attached to the piezoelectric element 430 receives force in a direction in which the bonding surface shrinks. When the optical low-pass filter 410 receives the force, one surface of the optical low-pass filter 410 facing the piezoelectric element 430 deforms in a direction in which the optical low-pass filter 410 shrinks and the other surface of the optical low-pass filter 410 deforms in a direction in which the optical low-pass filter 410 expands in a sectional view. Therefore, the optical low-pass filter 410 has a deformed portion having a recessed portion including the piezoelectric element 430 therein. Therefore, inversed flexion deformity relative to the flexion deformity generated when the positive voltage is applied to the electrode AF is generated. That is, the flexion deformity indicated by dashed-two dotted lines shown in FIG. 9 is generated in the optical low-pass filter 410.

Accordingly, a standing wave vibration is generated when a state in which a positive voltage is applied to the electrode AF and the electrode AB is grounded and a state in which a positive voltage is applied to the electrode AB and the electrode AF is grounded are switched to each other in predetermined cycles. That is, a periodic vibration in which a state indicated by the solid lines and a state indicated by the dashed-two dotted lines shown in FIG. 9 are alternately repeated is generated due to a function of the piezoelectric member 430a. A frequency of a periodic voltage is set so as to be in the vicinity of a resonant frequency of an eigenmode of the optical low-pass filter 410 so that large amplitude is obtained even with a small applied voltage, which is efficient. Furthermore, the optical low-pass filter 410 has a plurality of resonant frequencies. When a voltage is applied to the optical low-pass filter 410 in each of the plurality of resonant frequencies, vibrations of different orders in different vibration modes are obtained. FIG. 9 shows a seventh-order vibration mode having seven antinodes and an eighth-order vibration mode having eight antinodes.

Figure 10:
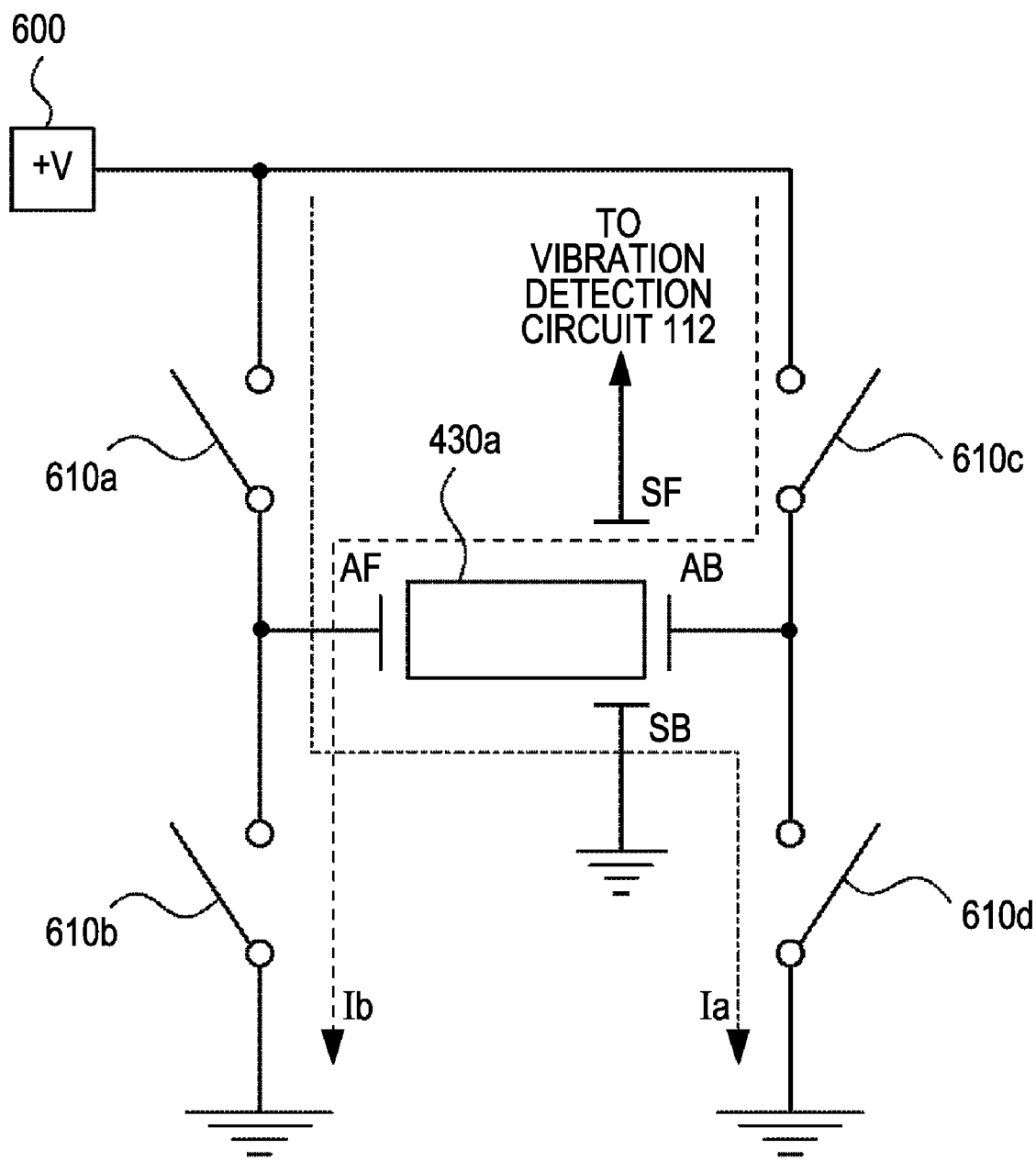
FIG. 10 is a diagram schematically illustrating a piezoelectric element driving circuit and the piezoelectric element.
Figure 11:
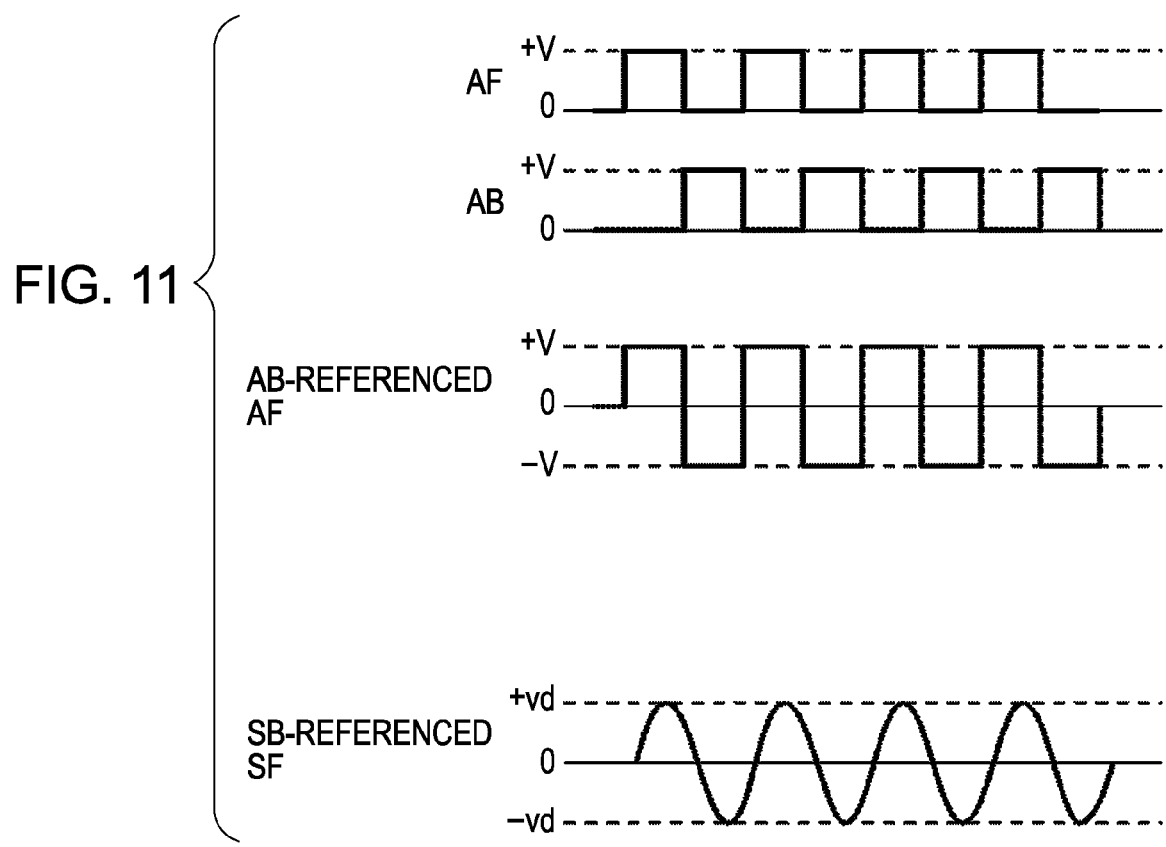
FIG. 11 is a diagram illustrating operation waveforms in accordance with an operation of the piezoelectric driving circuit which are detected using a vibration detection circuit.

Referring to FIGS. 10 and 11, the piezoelectric element 430, an piezoelectric element driving circuit, and a method for driving the piezoelectric element 430 will be described. FIG. 10 is a diagram schematically illustrating the piezoelectric element driving circuit 111 and the piezoelectric element 430. FIG. 11 is a diagram illustrating operation waveforms used to describe an operation of the piezoelectric element driving circuit 111 and results detected using a vibration detection circuit.

The piezoelectric element driving circuit 111 includes, as shown in FIG. 10, a direct current (DC) power supply 600 which supplies a voltage of +V, switching elements 610a to 610d, and a controller (not shown) which performs a periodic switching operation on the switching elements 610a to 610d. The controller determines a specific cycle in accordance with a driving pulse output from a pulse generation circuit included therein and performs the switching operation.

The piezoelectric member 430a includes, as described above, the electrodes AF and BF serving as the driving electrodes, the electrode SF serving as the vibration detection electrode, and the electrode SB serving as the ground electrode. The electrode AF is connected to the switching elements 610a and 610b, and the electrode AB is connected to the switching elements 610c and 610d. The electrode SF is connected to the vibration detection circuit 112. The switching elements 610a and 610c are connected to the DC power supply 600, and the electrode SB and the switching elements 610b and 610d are grounded. In this way, an H-bridge (full-bridge) switching circuit is configured. Note that although MOSFETs are generally used for the switching elements 610a to 610d, other semiconductor elements such as bipolar transistors or controllable mechanical contact elements may be employed.

The vibration detection circuit 112 detects a potential difference generated due to expansion and contraction of a piezoelectric member.

Referring to five timing charts in FIG. 11, axel of abscissa denote elapsed times and axel of ordinate denote voltages. As shown in FIG. 11, the pulse generation circuit applies driving pulses represented by square waves in which a voltage of +V and a voltage of 0 are alternately repeated to the electrodes AF and AB. When the controller turns the switching elements 610a and 610d on and turns the switching elements 610b and 610c off, a current is supplied as shown by dashed-dotted lines Ia of FIG. 10, and the electrode AF has a voltage of +V and the electrode AB has a voltage of 0. On the other hand, when the controller turns the switching elements 610b and 610c on and turns the switching elements 610a and 610d off, a current is supplied as shown by a dotted line Ib of FIG. 10, and the electrode AF has a voltage of 0 and the electrode AB has a voltage of +V. This operation is repeatedly performed in the resonant frequencies of the optical low-pass filter 410 whereby the piezoelectric element 430 is vibrated.

Here, a driving voltage for the piezoelectric element 430 substantially equal to the voltage of the electrode AF relative to the voltage of the electrode AB (a voltage obtained by subtracting the voltage of the electrode AB from the voltage of the electrode AF), and as shown as an "AB-referenced AF" of FIG. 11, a voltage of +V and a voltage of −V are alternately repeated. Accordingly, the piezoelectric element 430 is driven with a potential difference twice a power supply voltage. That is, the H-bridge circuit uses a power supply voltage half of that of a half-bridge circuit. Since the H-bridge circuit requires the reduced power supply voltage, a lower withstand pressure level is required and miniaturization of a circuit and reduction of cost are attained.

Detection of a vibration state using the electrode SF will be described later.

Referring back to FIG. 9, the vibration operation will be continuously described. As described above, the standing wave vibration is generated in the optical low-pass filter 410 due to the expansion and contraction of the piezoelectric element 430. As shown in FIG. 9, nodes (nodes d1 to d8 or nodes D1 to D9) and antinodes are alternately generated in the standing wave vibration. The nodes of the vibration correspond to portions of the standing wave which have amplitudes of substantially zero, and the antinodes of the vibration correspond to portions which exhibit maximum amplitudes between the adjacent nodes. When dust adhering to the surface of the optical low-pass filter 410 is intended to be removed, accelerated velocity should be applied to the dust so that force larger than attachment force is generated. However, the accelerated velocity is substantially zero since the amplitudes of the nodes of the vibration are substantially zero. Accordingly, the dust is not removed using the accelerated velocity against the attachment force. Therefore, when the optical low-pass filter 410 is vibrated in a single vibration mode, the dust remains on the nodes of the vibration.

To address this disadvantage, the piezoelectric element 430 is controlled so that after the optical low-pass filter 410 is vibrated as a first vibration mode, the optical low-pass filter 410 is again vibrated as a second vibration mode. By this, dust which remains even after the first vibration mode is operated may be removed by the second vibration mode. In this case, if nodes in the first vibration mode overlap nodes in the second vibration mode, dust which deposits on the overlapped nodes are not removed. Therefore, the nodes in the first vibration mode and the nodes in the second vibration mode should not be overlapped with one another. Accordingly, a combination of vibration modes to be used is preferably a combination of a vibration mode having even numbers of nodes (that is, an odd-numbered-order vibration mode) and a vibration mode having odd numbers of nodes (that is, an even-numbered-order vibration mode). In this exemplary embodiment, a combination of the seventh-order vibration mode (including eight nodes) and the eighth-order vibration mode (including ninth nodes) is employed.

Note that although resonant frequencies of the optical low-pass filter 410 are determined in accordance with a shape, a thickness, and material of the optical low-pass filter 410, among the resonant frequencies, resonant frequencies out of an audible range are preferably selected so that generation of uncomfortable sound is avoided. In this exemplary embodiment, vibrations are generated in the seventh-order vibration mode and the eighth-order vibration mode as examples. However, the vibration mode is not limited to these, and a vibration mode of any other order may be employed to generate a vibration, and furthermore, a three or more vibration modes may be used.

Configuration of Supported Portions of Optical Low-pass Filter

Figures 12A, 12B:
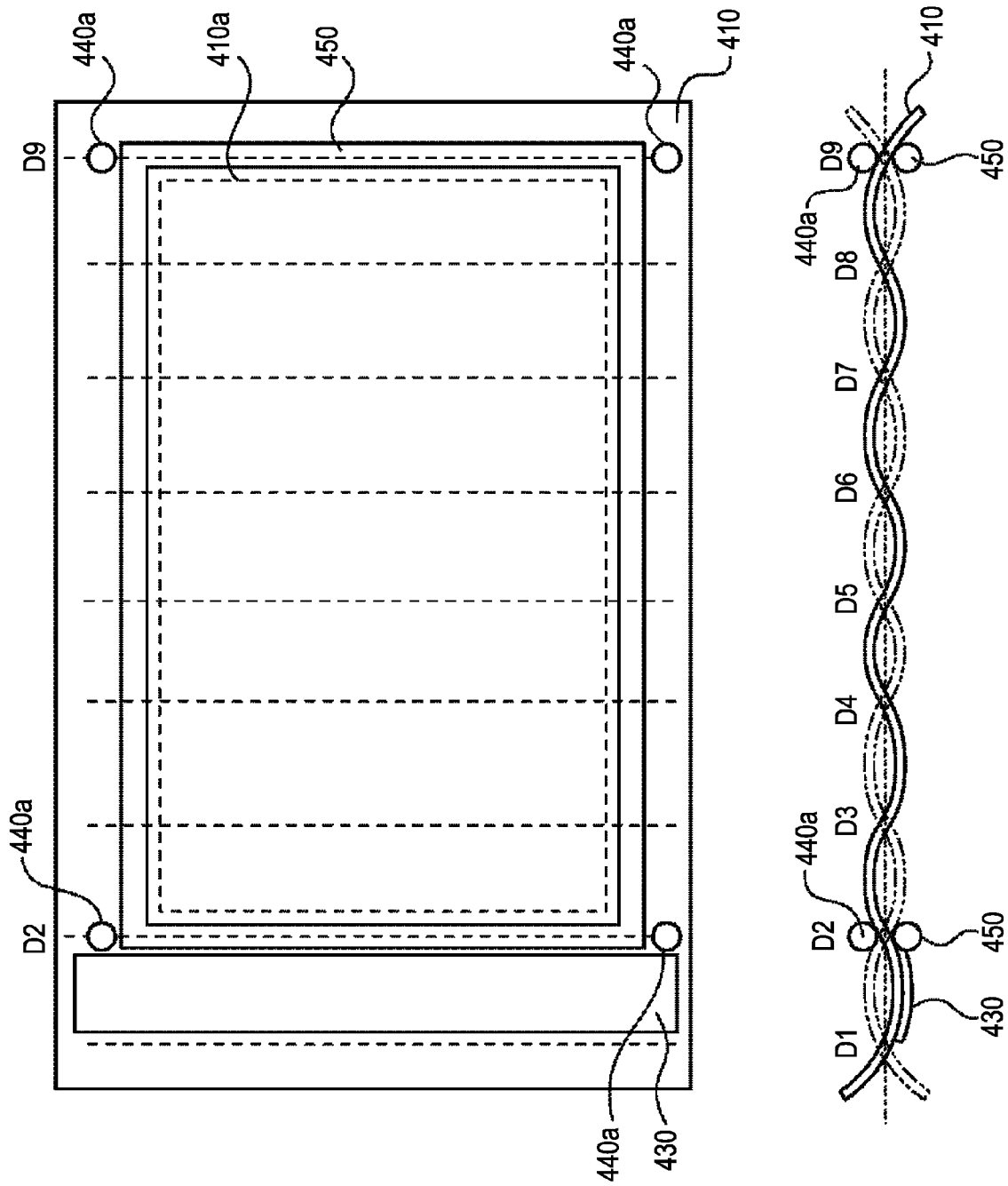
FIGS. 12A and 12B are diagrams illustrating supported portions of the optical low-pass filter and a vibration waveform of the optical low-pass filter and the piezoelectric element.

FIGS. 12A and 12B are diagrams illustrating supported portions of the optical low-pass filter and vibration waveforms of the optical low-pass filter and the piezoelectric element. Note that although the seventh-order vibration mode and the eighth-order vibration mode are used to generate vibrations in this exemplary embodiment, FIG. 12 shows only a vibration form in the eighth-order vibration mode. The standing wave vibration includes nodes and antinodes generated substantially in parallel to the long sides of the piezoelectric element 430.

As shown in FIG. 12B, the optical low-pass filter 410 is supported by the urging member 440 and the elastic member 450 so as to be sandwiched therebetween.

Figure 13:
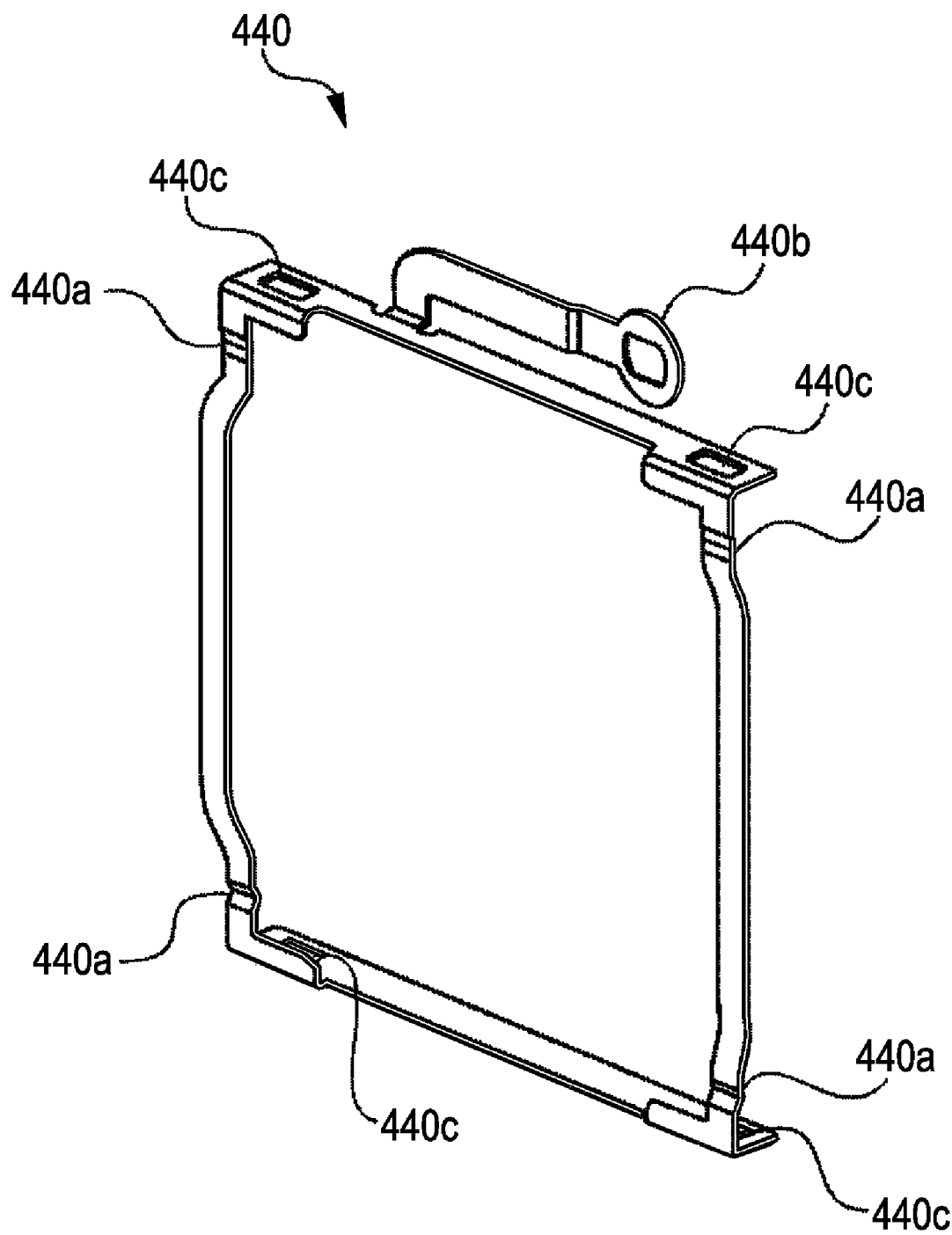
FIG. 13 is a perspective view illustrating urging members.

Referring now to FIG. 13, a shape of the urging member 440 will be described. FIG. 13 is a perspective view illustrating the urging member 440. The urging member 440 is formed by punching and bending a thin stainless plate, and has a characteristic of a plate spring as a whole. Recessed contact portions 440a are formed on the urging member 440 so as to contact the surface of the optical low-pass filter 410 at four portions. The urging member 440 is engaged with the optical low-pass filter holding member 420 using hook-receiving portions 440c. Accordingly, the optical low-pass filter 410 is urged toward the image pickup element 33. That is, the urging member 440 supports the optical low-pass filter 410 only using the four recessed contact portions 440a from the object side. Note that a ground portion 440b is used to connect the surface of the optical low-pass filter 410 to the ground (0V).

Referring back to FIG. 12, the optical low-pass filter 410 is attached to the urging member 440 using the recessed contact portions 440a corresponding to portions out of the image pickup effective region 410a, and is attached to the elastic member 450 in a rectangular shape portion arranged out of the image pickup effective region 410a.

In general, when an object contacts a vibrated object, the vibration attenuates. However, when the object contacts one of nodes of the vibration which have amplitudes of 0, the attenuation of the vibration is reduced. Taking this into consideration, the four portions (recessed contact portions 440a) of the urging member 440 which are attached to the optical low-pass filter 410 and two sides of the rectangular portion of the elastic member 450 which are parallel to the nodes and which are attached to the optical low-pass filter 410 are arranged in the vicinity of the nodes (the nodes D2 and D9 in FIG. 12) of the vibration. Since not only the amplitudes of the nodes but also amplitudes in the vicinity of nodes are small, the attenuation of the vibration of the optical low-pass filter 410 is reduced. Accordingly, the optical low-pass filter 410 is supported without deteriorating capability of removing foreign substances of the optical low-pass filter 410.

As is apparent from this exemplary embodiment, in a vibration mode in which nodes are generated in a direction parallel to short sides of the optical low-pass filter 410 which is substantially rectangular member, portions where the nodes are generated are obvious. FIGS. 14A and 14B are diagrams illustrating a vibration waveform of the optical low-pass filter 410 solely operated in an eighth-order vibration mode, for example. In FIG. 14A, dotted lines denote nodes of a vibration.

As shown in FIGS. 14A and 14B, the nodes of the vibration of the optical low-pass filter 410 are generated in first positions shifted inward by quarter wavelength from the both short sides (two sides extending in parallel to the nodes) of the optical low-pass filter 410 and in positions shifted inward by every half wavelength from the first positions. Note that the "wavelength" means a distance between adjacent antinodes having identical phases (or a horizontal distance from a certain peak to the next peak (or from a certain trough to the next trough)) of a wave, and is specifically shown as a distance λ in FIG. 14B. Therefore, on a surface of the optical low-pass filter 410 in which the piezoelectric element 430 is attached (a vibration-applying side), portions which are used to support the optical low-pass filter 410 are preferably positioned closer to an image pickup optical axis relative to a portion in which the piezoelectric element 430 is attached and in the vicinity of a node (the node D2 of FIG. 12) nearest the piezoelectric element 430. In addition, on a surface of the optical low-pass filter 410 in which the piezoelectric element 430 is not attached (a free end side), portions which are used to support the optical low-pass filter 410 are preferably in the vicinity of one (the node D9 of FIG. 12) of the nodes arranged in a portion shifted by quarter wavelength from an end. In this case, it is experimentally observed that a portion "in the vicinity of a node" described above is positioned within a range from one-eighth wavelength to three-eighths wavelength. When the portions supporting the optical low-pass filter 410 are included in this range, attenuation of the vibration of the optical low-pass filter 410 is reduced, and accordingly, a capability of removing foreign substance is not deteriorated.

In particular, on the surface of the optical low-pass filter 410 in which the piezoelectric element 430 is not attached (the free end side), if portions other than the node are used as the supported portions, amplitude of the vibration considerably attenuates, and therefore, force (accelerated velocity) required for removing dust is not generated. Accordingly, the supporting portions are required to correspond to the nodes. On the other hand, on the surface of the optical low-pass filter 410 in which the piezoelectric element 430 is attached (the vibration-applying side), attenuation of the amplitude which occurs due to the supported portions located in the portions other than the nodes is smaller than that occurring on the free end side since a vibration applying source (the piezoelectric element 430) is arranged on the optical low-pass filter 410.

Furthermore, as shown in FIG. 12, the piezoelectric element 430 is preferably attached to the optical low-pass filter 410 so as to overlap a center line between adjacent two nodes among the plurality of nodes including a corresponding one of the antinodes of the vibration in the vibration mode generated in the optical low-pass filter 410. Moreover, a length (width) of the piezoelectric element 430 in a short-side direction is preferably equal to or smaller than half the wavelength λ in the generated vibration mode. This is because large amplitude is efficiently generated with a small applied voltage without deteriorating the vibration of the standing wave of the optical low-pass filter 410 by attaching the piezoelectric element 430 to the optical low-pass filter 410 so that portions of the piezoelectric element 430 which expand and shrink due to the applied voltage face the antinodes of the vibration of the optical low-pass filter 410.

Note that the optical member in this exemplary embodiment is not limited to the optical low-pass filter 410. For example, although this exemplary embodiment employs a configuration in which vibration of a standing wave is excited in a quartz birefringent plate, the birefringent plate may be made of lithium niobate instead of quartz. Alternatively, a vibration of a standing wave may be excited in an optical low-pass filter configured by laminating a birefringent plate, a phase plate, and an infrared absorbing filter on one another or in a solo infrared absorbing filter. Moreover, a vibration of a standing wave may be excited in a solo glass plate arranged in front of a birefringent plate.

Detection of Vibration State

Referring back to FIG. 11, detection of a vibration state of the piezoelectric element 430 will be described. In accordance with a vibration of the piezoelectric element 430, a sinusoidal voltage is generated in the electrode SF due to a piezoelectric effect. Here, since the electrode SB is normally maintained in a ground voltage (0V), the vibration detection circuit 112 obtains a sinusoidal waveform shown as "SB-referenced SF" of FIG. 11. A potential difference detected between a voltage of +vd(V) and a voltage of −vd(V) is proportional to vibration amplitude of the piezoelectric element 430 or vibration amplitude of the optical low-pass filter 410. Therefore, a vibration state of the piezoelectric element 430 or the vibration state of the optical low-pass filter 410 can be detected by monitoring a voltage waveform (vibration detection waveform) of "SB-referenced SF".

The following two operations are collaterally performed when the vibration state is detected.

Firstly, detection of resonant frequencies is performed. As described above, the optical low-pass filter 410 is preferably vibrated in resonant frequencies thereof. In this exemplary embodiment, a resonant frequency corresponding to the seventh-order vibration mode and a resonant frequency corresponding to the eighth-order vibration mode should be detected, and the piezoelectric element 430 should be vibrated in these resonant frequencies. To detect the resonant frequencies, frequency bands including the resonant frequencies are determined in advance taking a theoretical figure and variations of design and assembly into consideration, and the driving frequency of the piezoelectric element 430 is gradually changed within a range of the determined frequency bands so that frequencies which make amplitude of a vibration detection waveform maximum are detected. Then, predetermined frequency bands including the resonant frequencies are used as driving frequencies of the piezoelectric element 430 which are used to vibrate the optical low-pass filter 410. The operation of detecting the resonant frequencies may be performed not only in a process of mass production in a factory but also when a user uses the camera. Accordingly, the optical low-pass filter 410 is vibrated with resonant frequencies obtained in accordance with a use environment of the camera and deterioration of the camera with age so as to perform an operation of removing foreign substances. In this way, the vibration detection circuit 112 serves as a resonant frequency detection circuit.

Secondly, failure detection or abnormality detection is performed. In the operation of detecting resonant frequencies, when detected amplitude is considerably smaller than assumed amplitude or when the vibration detection waveform is abnormal, it is determined that the foreign substance removing unit has an abnormality. Therefore, measures against the abnormality such as stop of an operation of the foreign substance removing unit and change of the foreign substance removing unit may be taken.

Operation of Removing Foreign Substance

Figure 15:
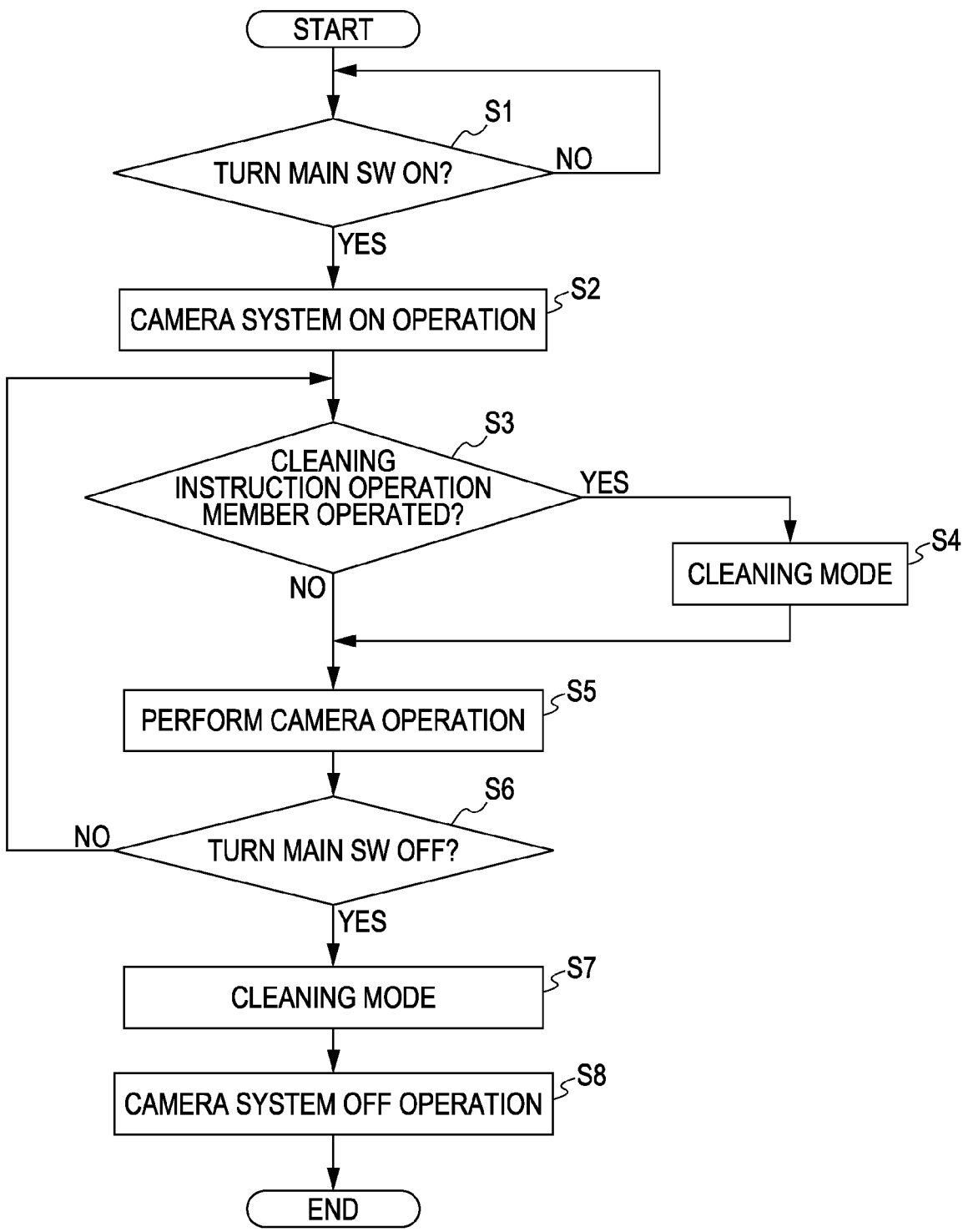
FIG. 15 is a flowchart illustrating an operation of removing foreign substances adhering to a surface of the optical low-pass filter.

Referring now to FIG. 15, an operation of removing foreign substances such as dust adhering to the surface of the optical low-pass filter 410 will be described. In step S1, it is determined whether a power ON operation was performed by operating the main switch 43. When the determination is affirmative, the process proceeds to step S2 where a camera system ON operation which enables the camera to operate a photographing operation is performed. In this camera system ON operation, the camera is activated, the power supply circuit 110 supplies electric power to circuits of the camera, and a system of the camera is initialized.

In step S3, it is determined whether a user operated the cleaning instruction operation member 44. When the determination is affirmative, the process proceeds to step S4, and otherwise, the process proceeds to step S5. Note that although the cleaning instruction operation member 44 is provided in this exemplary embodiment, the present invention is not limited to this. For example, a cleaning mode is entered not only by operating a mechanical button but also by being instructed from a menu screen displayed in the color liquid crystal monitor 19 using a cursor key or an instruction button.

In step S4, in response to the instruction of start of the cleaning mode, the camera enters the cleaning mode. Specifically, the power supply circuit 110 supplies electric power required for the cleaning mode to the circuits of the camera body 1. Simultaneously, the power supply circuit 110 detects a remaining battery level of the power supply device 42, and supplies a result of the detection to the MPU 100. The MPU 100 receives a signal representing the start of the cleaning mode, and supplies a driving instruction to the piezoelectric element driving circuit 111. In response to the driving instruction, the piezoelectric element driving circuit 111 generates a periodic voltage used to excite a standing wave vibration of the optical low-pass filter 410, and applies the periodic voltage to the piezoelectric element 430. The piezoelectric element 430 expands and shrinks as described above in accordance with the applied periodic voltage so that the standing wave vibration is generated in the optical low-pass filter 410. When the cleaning mode is terminated, the process proceeds to step S5.

In step S5, a camera operation is performed in response to signals supplied from the switch SW1 (7a), the switch SW2 (7b), the main operation dial 8, the sub operation dial 20, the photographing mode setting dial 14, and other switches. The camera operation corresponds to a mode in which photographing operations and setting operations which are the same as those performed in general cameras are performed, and therefore, a detailed description thereof is omitted herein.

In step S6, it is determined whether a power OFF operation was performed by operating the main switch 43 in a standby state thereof. When the determination is affirmative, the process proceeds to step S7, and otherwise, the process returns to step S3.

In step S7, a cleaning mode the same as that in step S4 is entered, and then, the process proceeds to step S8. Note that, in the cleaning mode in step 7, parameters regarding a driving frequency, a driving period of time, and a control method of the piezoelectric element 430 may be different from those in the cleaning mode in step S4.

In step S8, the MPU 100 controls the units in the camera to terminate their operation, controls the EEPROM 100a to store required information, for example, and controls the power supply circuit 110 to stop supplying the electric power to the circuits, whereby a camera system OFF operation is performed.

As described above, the cleaning mode is entered not only in an arbitrary timing in which the user desires but also after the electric power OFF operation is performed. That is, the camera system OFF operation is performed after the operation of removing foreign substances attached to the surface of the optical low-pass filter 410.

Various types of foreign substance adhere to the surface of the optical low-pass filter 410. It is experimentally proved that, in general, if the foreign substances are left on the optical low-pass filter 410 for a long period of time, it is difficult to remove the foreign substances even if vibration is applied to the optical low-pass filter 410 in a cleaning mode. This may occur because adhesion force such as liquid bridge force is increased due to dew condensation caused by environmental change (change of temperature or humidity level) or because dust firmly adheres to the optical low-pass filter 410 after repeatedly being moisturized and swelled and being dried. In addition, when rubber is employed as the elastic material, for example, oil included in the rubber bleeds and adheres thereto. Therefore, a cleaning mode which is operated after the power OFF operation is more efficient and more effective than a cleaning mode which is operated after the power ON operation, since it is difficult to remove foreign substances in the cleaning mode operated after the power ON operation if the camera is not used for a long period of time.

Although the camera system OFF operation is performed after the power OFF operation is instructed using the main switch 43 in this exemplary embodiment, the camera system OFF operation may be performed after a predetermined period of time elapsed in a power ON state. In this case also, the cleaning mode is operated before the camera system OFF operation whereby effects similar to this exemplary embodiment may be attained.

Although the exemplary embodiments of the present invention have been described as above, the present invention is not limited to this, and various modifications may be made within the scope of the invention. For example, although the exemplary embodiment of the present invention is applied to the digital still camera, the exemplary embodiment is applicable to optical apparatuses such as liquid crystal projectors. Specifically, when foreign substances such as dust are attached to a surface of an optical member in a projection optical system of an optical apparatus such as a projector, shadow of the foreign substances is projected. Accordingly, to address this problem, a configuration the same as that in this exemplary embodiment may be employed.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

What is claimed is:

1. A driving device comprising:
a vibrated member;
a piezoelectric member which vibrates the vibrated member;
a first driving electrode formed on a first surface of the piezoelectric member;
a second driving electrode which is formed on a second surface of the piezoelectric member, the second driving electrode is formed in opposed position from the first driving electrode;
a vibration detection electrode formed on the first surface of the piezoelectric member separately from the first driving electrode;
a ground electrode formed on the second surface of the piezoelectric member separately from the second driving electrode, the ground electrode is formed in opposed position from the vibration detection electrode;
a control circuit configured to be connected to the first and second driving electrodes, configured to cause the second driving electrode to be connected to a ground when a voltage is applied to the first driving electrode, and configured to cause the first driving electrode to be connected to the ground when a voltage is applied to the second driving electrode; and
a resonant frequency detection unit configured to be connected to the vibration detection electrode and configured to detect resonant frequencies of the vibrated member,
wherein a standing wave is appeared in the vibrated member when the control circuit applies voltage to the first driving electrode or second driving electrode,
wherein the piezoelectric member is bonded to the vibrated member so that the piezoelectric member overlaps one of a plurality of antinodes of the standing wave, and
wherein a length of the piezoelectric member in a short-side direction is equal to or smaller than half the wavelength of the standing wave.

2. An image pickup apparatus including the driving device according to claim 1,
wherein the vibrated member corresponds to an optical element arranged in front of an image pickup element which performs photoelectric conversion on an object image,
the piezoelectric member is bonded to the optical element in a position outside a portion on which an effective light beam of the object image is incident, and
the portion on which the piezoelectric member of the optical element is bonded is uncoated.

3. The driving device according to claim 1,
wherein the control circuit controls the piezoelectric member so that after the vibrated member is vibrated as a first vibration mode, the vibrated member is again vibrated as a second vibration mode,
wherein a node in the first vibration mode and a node in the second vibration mode is not overlapped each other.

4. A driving device comprising:
a vibrated member;
a piezoelectric member which vibrates the vibrated member;
a first driving electrode formed on a first surface of the piezoelectric member;
a second driving electrode which is formed on a second surface of the piezoelectric member, the second driving electrode is formed in opposed position from the first driving electrode;
a third driving electrode formed on the first surface of the piezoelectric member separately from the first driving electrode, the third driving electrode is electrically connected to the second driving electrode;
a vibration detection electrode formed on the first surface of the piezoelectric member separately from the first driving electrode and third driving electrode;
a first ground electrode formed on the second surface of the piezoelectric member separately from the second driving electrode, the first ground electrode is formed in opposed position from the vibration detection electrode;
a second ground electrode formed on the first surface of the piezoelectric member separately from the first driving electrode, the third driving electrode and the vibration detection electrode, the second ground electrode is electrically connected to the first ground electrode;
a control circuit configured to control the piezoelectric member, configured to be connected to the first driving electrode, the second driving electrode and the third driving electrode, configured to cause the second driving electrode and the third driving electrode to be connected to a ground when a voltage is applied to the first driving electrode, and configured to cause the first driving electrode to be connected to the ground when a voltage is applied to the second driving electrode or the third driving electrode; and a resonant frequency detection unit configured to be connected to the vibration detection electrode and configured to detect resonant frequencies of the vibrated member.

5. An image pickup apparatus including the driving device according to claim 4,
wherein the vibrated member corresponds to an optical element arranged in front of an image pickup element which performs photoelectric conversion on an object image,
the piezoelectric member is bonded to the optical element in a position outside a portion on which an effective light beam of the object image is incident, and the portion on which the piezoelectric member of the optical element is bonded is uncoated.

6. The driving device according to claim 4,
wherein the control circuit controls the piezoelectric member so that after the vibrated member is vibrated as a first vibration mode, the vibrated member is again vibrated as a second vibration mode,
wherein a node in the first vibration mode and a node in the second vibration mode is not overlapped each other.

* * * * *